United States Patent [19]
Inagaki et al.

[11] Patent Number: 5,599,759
[45] Date of Patent: Feb. 4, 1997

[54] PROCESS FOR PRODUCING POROUS SILICON OXIDE MATERIAL

[75] Inventors: Shinji Inagaki; Yoshiaki Fukushima; Yuri Yamada, all of Aichi-ken, Japan

[73] Assignee: Kabushiki Kaisha Toyota Chuo Kenkyusho, Japan

[21] Appl. No.: 493,042

[22] Filed: Jun. 21, 1995

[30] Foreign Application Priority Data

Jun. 22, 1994 [JP] Japan .................... 6-164484

[51] Int. Cl.$^6$ ............................... B01J 21/16
[52] U.S. Cl. .................. 502/80; 502/232; 502/407; 423/325
[58] Field of Search .................... 502/232, 407, 502/80; 423/325

[56] References Cited

U.S. PATENT DOCUMENTS

| | | | |
|---|---|---|---|
| 5,057,296 | 10/1991 | Beck | 423/277 |
| 5,110,573 | 5/1992 | Johnson | 423/328 |
| 5,382,558 | 1/1995 | Inagaki | 502/407 |
| 5,393,329 | 2/1995 | Inagaki et al. | 96/131 |

OTHER PUBLICATIONS

US Pat. Ser. No. 08/192,933 Feb. 7, 1994 Inagaki, et al.
US Pat. Ser. No. 08/192,962 Feb. 7, 1994 Inagaki, et al.

*Primary Examiner*—Michael Lewis
*Assistant Examiner*—Amy M. Harding
*Attorney, Agent, or Firm*—Stroock & Stroock & Lavan

[57] ABSTRACT

A process for producing a heat-resistant and high-purity porous silicon oxide material having excellent crystallinity and uniformity in pore size. The process includes: a first step of dispersing a substance containing silicon in an aqueous solution of a surfactant and adjusting the pH of the dispersion to a value of 10 or higher; a second step of adjusting the pH thereof to a value lower than 10 and forming a composite of a silicon oxide and a surfactant; and a third step of removing the surfactant from the composite. A water-soluble component is preferably removed from the dispersion between the first and second steps.

22 Claims, 17 Drawing Sheets

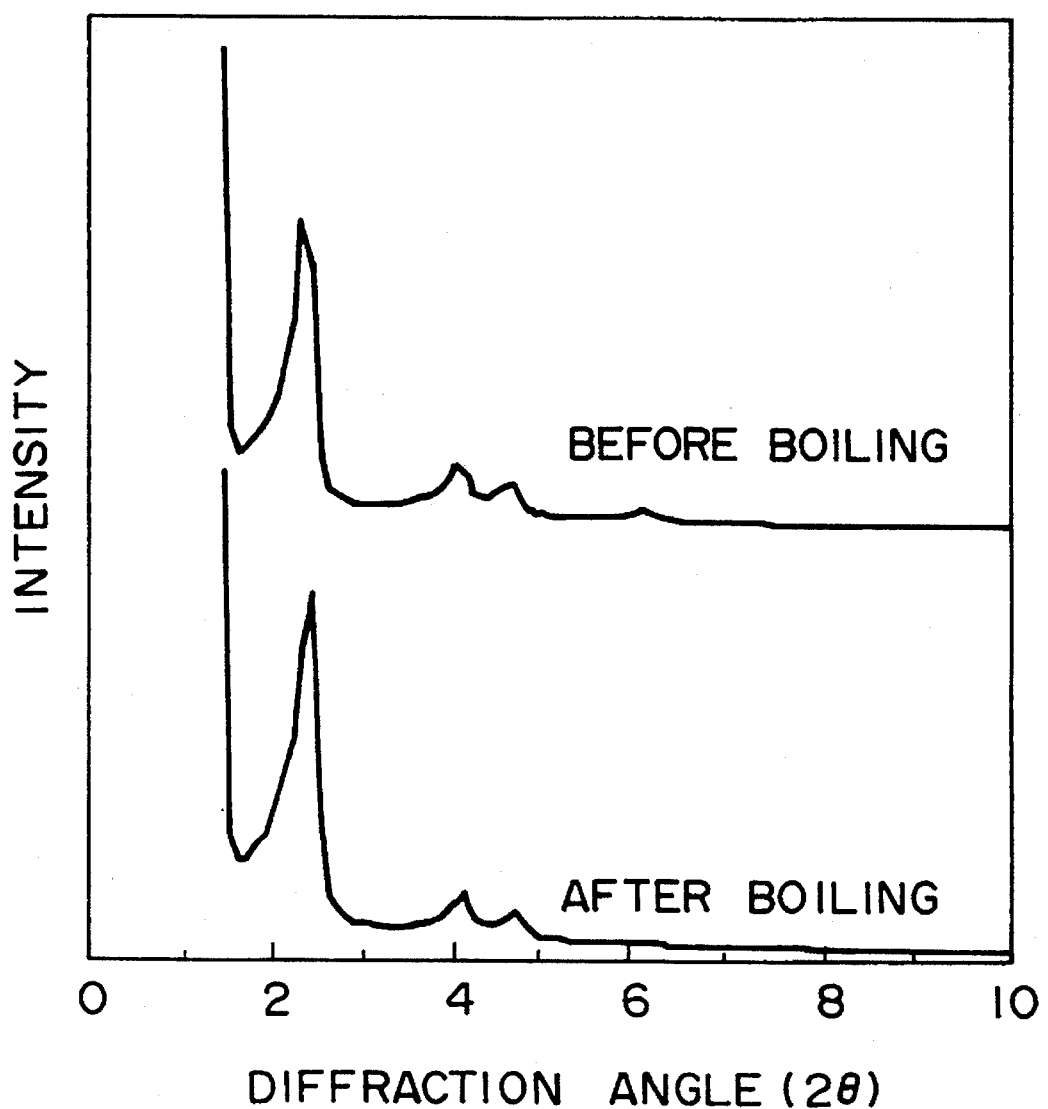

PROCESS FOR PRODUCING POROUS SILICON OXIDE MATERIAL

BACKGROUND OF THE INVENTION

1. Field of the Invention

The present invention relates to a process for producing a porous silicon oxide material having mesopores suitable for use as supports for catalysts and the like, adsorbents for hydrocarbons and the like, fixing supports for enzymes and the like, and synthetic sites for functional substances and the like.

2. Description of the Related Art

Silica gel, activated carbon, and amorphous or crystalline porous materials such as zeolites have been widely used heretofore as supports for catalysts and the like, adsorbents for hydrocarbons and the like, fixing supports for enzymes and the like, and synthetic sites for functional substances and the like.

In particular, because pores of uniform size are distributed over the entire structure, the crystalline porous material inclusive of zeolites exhibit excellent characteristics recognized as "shape selectivity". More specifically, for example, a crystalline porous material undergoes selective catalytic reaction, and provides the function of selective adsorption and separation.

The selective catalytic reaction of a crystalline porous material is described in detail below.

Reactant selectivity occurs in case the crystalline porous material is used as a support or a synthetic site or field, because only the reactant molecules smaller than the pore size of the crystalline porous material can be selectively reacted. Otherwise, product selectivity occurs in case reaction products smaller than the pore diameter are selectively produced. By taking the advantage of these types of selectivity, the desired reactant molecules alone can be reacted, or only the intended reaction products can be obtained.

The function of selective adsorption and separation relates to the adsorption and desorption of a gas, or to the trapping of a gas using the aforementioned crystalline porous material. More specifically, a mixture of gases comprising gas molecules differing in diameter is passed through the crystalline porous material, such that a specified gas alone can be adsorbed, desorbed, or fixed from the gas mixture depending on the pore dimension of the crystalline porous material.

Higher performance can be expected in the function of selective adsorption and desorption of the crystalline porous material by increasing the uniformity in pore size, or by increasing the crystallinity as well as the purity of the crystalline porous material.

However, there are problems on the crystalline porous material described above yet to be solved. For instance, the crystalline porous materials described hereinbefore are not suitable for use as a support in a catalytic reaction involving relatively large molecules of, for example, trimethylbenzene or naphthalene. They cannot be used as the adsorbents for adsorbing and separating such relatively large molecules. This is ascribed to the fact that even maximum pore diameter available on a zeolite or the like that is used conventionally as the crystalline porous materials is too small; more specifically, a maximum pore diameter available in a conventional crystalline porous material is 1.3 nm.

Concerning a reaction involving smaller molecules, on the other hand, the crystalline porous materials are sometimes found to function insufficiently as supports for the catalytic reaction and the like. A catalytic reaction in the purification of an exhaust gas can be mentioned as an example for such an insufficient catalytic reaction because the blow rate of an exhaust gas is very high. In such a case, it takes much time for reactant molecules to reach the active sites because the pore dimension of the porous material is too small, the gaseous reactant passes over the catalyst before the activity of the catalyst is fully exerted thereto.

Recently, in the light of the aforementioned circumstances, mesoporous materials characterized by their large and uniform pores have been proposed.

The mesoporous material is characterized by its three-dimensional framework structure, and it contains fine pores of uniform size ranging from 1.5 to 10 nm in diameter.

The mesoporous material can be produced by using a layered silicate or a non-layered silicate such as water glass, tetraethylorthosilicate, or silica as the starting material, and bringing the starting material into contact with a surfactant.

First, the process for producing mesoporous materials by using a layered silicate as the starting material is described in U.S. patent applications Ser. Nos. 08/192,933, and 08/192,962 (both filed Feb. 7, 1994), as including the steps of: (a) introducing an organic substance having a diameter of 10 Å or above by ion exchange into the interlayer space of crystals of layered silicates, and forming interlayer bridges of $SiO_2$ by condensation of surface silanols; (b) bringing the intercalated compounds into contact with a salt of a metal other than silicon; and (c) firing the products at a high temperature to remove organic composition and to fix the metal ion into the frame works; the steps being carried out in the order of either (a), (b) and (c); (b), (a) and (c); (a) and (b) at the same time and (c), or (a), (c), (b) and (c). These entire references are incorporated herein by reference.

A similar process for producing mesoporous materials by using a layered silicate (kanemite) as the starting material is described in Bull. Chem. Soc. Jpn., vol. 63, pg. 988(1990). Alkyltrimethylammonium-kanemite complexes were synthesized by the treatment of kanemite with alkyltrimethylammonium chloride solutions. $^{29}$Si-MAS NMR and X-ray powder diffraction clarified that $SiO_2$ layers in the complexes were condensed with each other to form three-dimensional $SiO_2$ networks. The calcined products of the complexes have micropores whose sizes increased with the length of the alkyl chain in the alkyltrimethylammonium ions used. These facts indicated the synthesis of porous $SiO_2$ with a controlled pore size. This entire reference is incorporated herein by reference.

A generalized description of these methods, including a proposed mechanism follows A layered silicate such as Kanemite is heated in an aqueous solution containing the surfactant dissolved therein. During this process step, the surfactant is introduced into the interlayers of the layered silicate to form micelles of the surfactant in the interlayers of the silicate. Furthermore, the silicate sheets constituting the layered silicate bend around the surfactant to partially combine with each other. In this manner, the silicate forms a three-dimensional structure to provide a composite of the surfactant and the three-dimensional silicate.

The composite thus obtained is separated from the aqueous solution, and is washed and dried thereafter.

Finally, the composite is subjected to the calcination process to obtain a mesoporous material. More specifically, by calcining, the surfactant is removed from the interior of the composite, and the pores are formed inside the composite.

The mesoporous material thus obtained is composed of silicate sheets which originally constituted the layered silicate used as the staring material, and the silicate sheets are bent and are partially combined with each other to form a three-dimensional structure. The resulting mesoporous material contains fine pores of uniform size ranging from 1.5 to 10 nm in diameter.

Then, the process for producing porous materials by using a non-layered silicate as the starting material is described in U.S. Pat. No. 5,057,296 as follows. The reference is incorporated herein by reference.

A non-layered silicate such as water glass or tetraethylorthosilicate or an amorphous silica is heated in an aqueous solution containing a surfactant dissolved therein. During this process step, the silicate particles aggregate around rod-like (micelle-like) surfactant, and the resulting silicate aggregates polymerize to form a three-dimensional structure by the heat applied thereto. In the same manner as in the production process using the layered silicate above, a composite of the surfactant and the three-dimensional silicate can be obtained.

The composite thus obtained is separated from the aqueous solution, followed by washing and drying thereafter. Finally, the composite is subjected to a process step of removing the surfactant from the composite and forming fine pores therein.

The mesoporous material thus obtained is composed of three-dimensional structure of silicate sheets, and contains fine pores of uniform size ranging from 1.5 to 10 nm in diameter.

In both of the processes described above, the composite is formed by heating a starting material comprising the silicate in an aqueous solution containing a surfactant dissolved therein. However, no operation of adjusting the pH value of the aqueous solution is effected in both of the processes.

The mesoporous materials produced according to the process above still have the problems below yet to be solved.

That is, the mesoporous materials thus obtained are inferior in crystallinity; moreover, the pores thereof are not uniform in size. Accordingly, superior shape selectivity cannot be expected. Furthermore, the mesoporous materials are insufficient in heat resistance.

Thus, they are not applicable to, for instance, cracking catalyst supports for petroleum, or catalyst supports for purifying exhaust gas discharged from automobiles. Even in calcination, the final step of production, the crystal structure and pore of the material may be destroyed by heat.

Furthermore, the mesoporous materials contain impurities at a considerable quantity. This decreases the concentration of mesopores and deteriorates the function of a porous material. Moreover, amorphous silica containing the impurities impairs the crystallinity of the mesoporous material.

SUMMARY OF THE INVENTION

In the light of the aforementioned problems related to conventional technology, the present invention aims to provide a process for producing a high purity porous material, yet improved in both crystallinity and heat resistance.

Accordingly, the present invention provides a process for producing a porous silicon oxide material comprising:

A process for producing a porous silicon oxide material, comprising:

a first step of dispersing a substance containing silicon in an aqueous solution of a surfactant, and adjusting the pH of the dispersion to a value of 10 or higher;

a second step of adjusting the pH of the dispersion to a value lower than 10, and forming a composite of a silicon oxide with the surfactant; and a third step of removing the surfactant from the composite.

The process for producing porous material according to the present invention is characterized in that it comprises the first to the third steps as described hereinbefore. The pH of the dispersion during the first step is maintained at a value of 10 or higher, and that during the second step is maintained at a value lower than 10.

In the first and the second steps, the composite is formed according to a mechanism described below.

In case of using a layered silicate as the silicon-containing substance, the surfactant is interposed between two neighboring layers of the layered silicate during the first step. In this manner, a composite comprising a surfactant structurally incorporated inside the layered silicate is obtained. In the subsequent second step, the silanol groups undergo dehydration and condensation to partially bond the layers and form a three-dimensional structure composed of silicates. That is, a composite comprising a three-dimensional structure and a surfactant is obtained.

In case of using a substance other than a layered silicate as the silicon-containing substance, the silicon-containing substance aggregates around the regularly arranged surfactants during the first step. During the second step, silicic acid containing hydroxyl groups is formed from the silicon-containing substance. The hydroxyl groups undergo condensation thereafter to form a polymer of the silicic acid. The polymer thus obtained-as a whole yield a composite comprising a three-dimensional structure (honey-comb structure), with surfactant incorporated inside the polymer (i.e., the cavity portions inside the honey-comb structure).

In the subsequent third step, the surfactant is removed, and the cavity which results provides the pores. Thus is obtained a high-porosity three-dimensional structure (a honey-comb structure) having a framework made from a silicon-containing substance.

It can be seen from the foregoing that the interlayer spacing cannot be expanded satisfactorily or the regularly arranged aggregate of micelle-like surfactant cannot be developed sufficiently if the surfactant functions insufficiently. Thus, a three-dimensional structure cannot be formed in a desired manner in such a case. A poorly crystalline porous material is obtained as a result. Furthermore, amorphous portions result from the portions in which the three-dimensional structure is not fully developed.

The function of the surfactant in the first step becomes more active with increasing pH value of the aqueous solution. It follows that the structural substitution in a layered silicate occurs for hydrogen ions in case a layered silicate is used as the silicon-containing substance. Thus, with increasing quantity of hydrogen ions, the exchange between the structural ions of the layer silicate and hydrogen ions occurs more frequently than that between the structural ions and the ions of the surfactant. More briefly, the hydrogen ions suppress the expansion of the interlayer spacing of the layered silicate by hindering the introduction of ions of the surfactant into the structure of the layered silicate. Accordingly, the preparation of a three-dimensional structure usually ends up unsuccessfully.

In case a substance other than a layered silicate is used as the silicon-containing substance, the formation of rod-like micelles from surfactant occurs less with increasing concentration of hydrogen ions in the aqueous solution. Accordingly, the silicon-containing substance tends to be dispersed randomly in the solution as to form less frequently the three-dimensional structures.

In the aforementioned second step according to the process of the present invention, the pH of the dispersion is maintained at a value lower than 10.

In case of using a layered silicate as the starting material, as described in the foregoing, the sheet-like silicates bend in the vicinity of the surfactant structurally incorporated into the composite by ion-exchange treatment, and the silanol groups in the resulting silicate sheets undergo dehydration condensation as to partially form bonding. In this manner, a three-dimensional structure which provides a thermally stable porous crystalline structure can be formed inside the composite.

Similarly, in case of using a substance other than a layered silicate as the starting material, the dehydration of silanol groups becomes active as to provide a three-dimensional structure having a thermally stable crystalline structure.

The dehydration condensation becomes more active with approaching neutral region concerning the pH value of the dispersion, and with increasing temperature. Thus, a three-dimensional structure with improved strength can be developed inside the composite.

By maintaining the pH of the dispersion at a value lower than 10, the metallic ions such as sodium ions which intruded into the surfactant/three-dimensional silicate composite during the first step can be substituted by hydrogen ions in the dispersion.

In case metallic ions are incorporated into the composite above, heating the composite increases the mobility of the silicon atoms and the oxygen atoms within the composite. This signifies that the thermal resistance of the composite above and the porous material obtained therefrom after removing the surfactant is impaired by the presence of the metallic ions. Accordingly, the heat resistance of the porous material can be improved by exchanging the metallic ions inside the structure with hydrogen ions in a manner described above.

Conclusively, a purified porous material with improved crystallinity can be obtained by effecting the first and the second steps above.

Moreover, because a thermally stable three-dimensional structure is realized, a porous material with fortified crystal structure and improved heat resistance can be obtained as a result.

Accordingly, the present invention provides a process for producing a highly crystalline porous material free of impurities, and yet, improved in heat resistance.

Additionally, the dehydration condensation of silanol groups can be accelerated as to swiftly form the three-dimensional structure by controlling the pH value of the dispersion above. Thus, as compared with a conventional process, the composite can be formed more rapidly and in a shorter period of time.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIG. 19 is a diagram showing the powder X-ray diffraction pattern for the porous material obtained in Example 6.

DETAILED DESCRIPTION OF THE INVENTION

Figure 1:
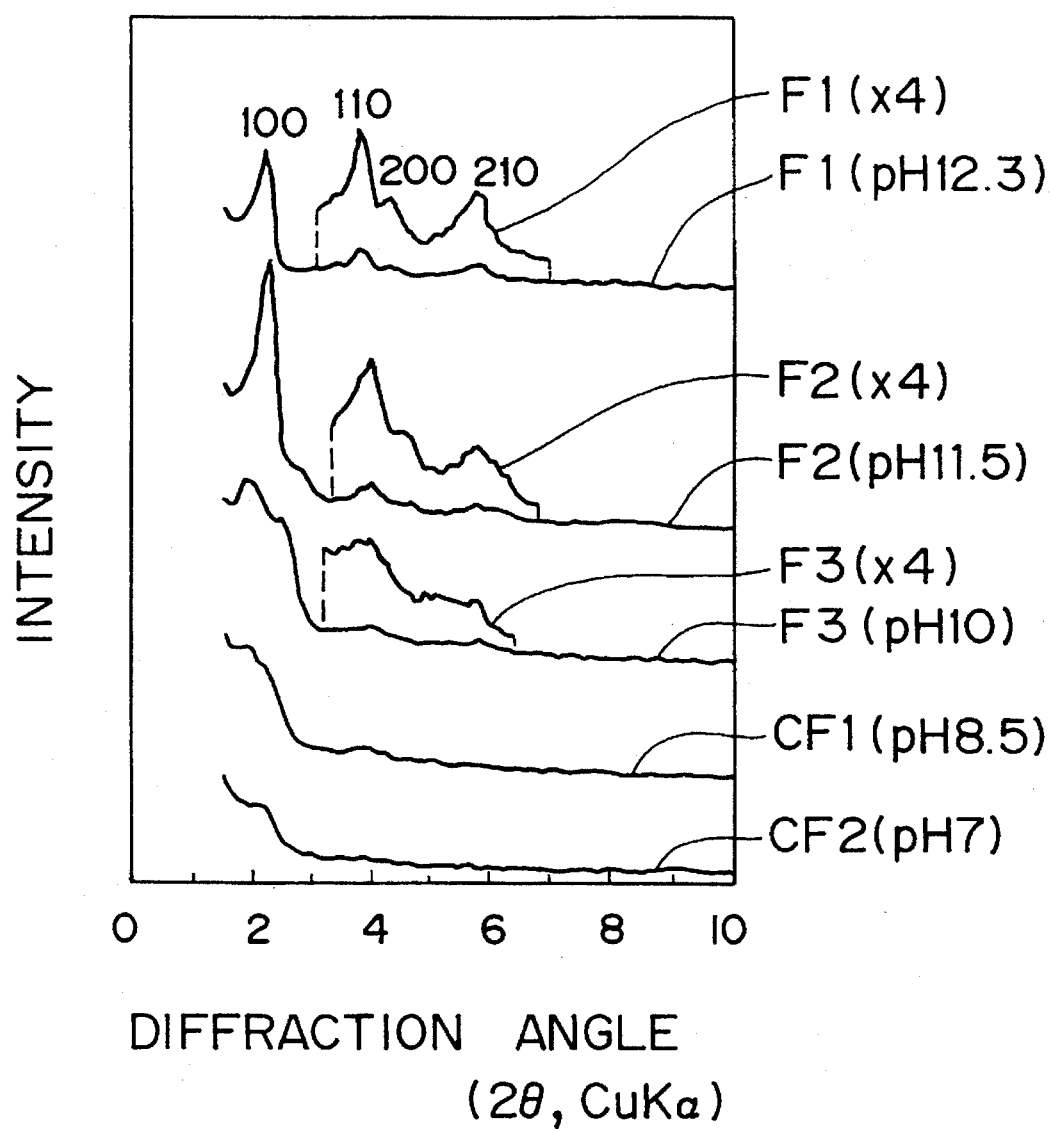
FIG. 1 is a diagram showing the powder X-ray diffraction patterns for each of the samples and comparative samples obtained in Example 1.

The key in the process according to the present invention is to maintain the pH of the dispersion in the first step at a value of 10 or higher, and that of the resulting dispersion in the second step at a value of lower than 10.

The first step as referred above comprises dispersing a silicon-containing substance into an aqueous solution containing dissolved therein a surfactant, and aging the resulting dispersion thereafter. This step is completed when the aqueous solution attains equilibrium, and a constant concentration for the surfactant in the dispersion is achieved. The dispersion is subjected to the second step upon completion of the first step.

As is described hereinafter, the surfactant functions in the first and the second steps of the process according to the present invention to form a three-dimensional structure of a silicon oxide.

In the first step described above, the substance containing silicon (sometimes referred to simply hereinafter as "the silicon-containing substance") is a starting material which supplies silicon for forming the porous silicon oxide material.

The silicon-containing substances include compounds of silicon, such as silicon oxide and silicates.

In case of dispersing a substance containing elements other than silicon and oxygen in addition to the substance containing silicon, or in case of using a composite substance containing silicon and an element other than silicon or oxygen as the substance containing silicon, the porous material results in a structure containing a composite of silicon and an element other than silicon and oxygen.

The elements other than silicon and oxygen include metals such as aluminum or magnesium.

In case of using a silicate as the substance containing silicon, included as the silicates are a layered silicate and silicates other than the layered silicates, such as sodium silicate, tetraethylorthosilicate [$Si(O-C_2H_5)_4$], or water glass.

In case of using a layered silicate, at least one selected from the group consisting of Kanemite ($NaHSi_2O_5 \cdot 3H_2O$), crystalline sodium disilicate ($Na_2Si_2O_5$), Makatite ($Na_2Si_4O_9 \cdot 5H_2O$), Ilerite ($Na_2Si_8O_{17} \cdot xH_2O$), Magadiite ($Na_2Si_{14}O_{29} \cdot xH_2O$), and Kenyaite ($Na_2Si_{20}O_{41} \cdot xH_2O$) is used. Particularly preferred among them are Kanemite, crystalline sodium disilicate, and Makatite, because they structurally comprise single $SiO_4$ layers suitable for bending.

In some cases, a substance which contains Al and the like as a partial substituent for Si can be used as the layered silicate.

In case of using a silicate other than a layered silicate, at least one selected from the group consisting of, for instance, water glass, glass, amorphous sodium silicate, and silicon alkoxide (e.g., tetraethylorthosilicate), is employed.

Substances containing silicon include, in addition to silicates, silica, silica-alumina, a mixed substance of silica and alumina, a silicon oxide, a silica-metal complex oxide, or a mixture of silica and a metal oxide.

In case of using a layered silicate as the substance containing silicon in the process according to the present invention, a surfactant intrudes between the layers of the layered silicate in the first step of the process. Thus, a composite containing the surfactant being introduced into the layered silicate can be formed. However, the neighboring layers in the resulting composite are not combined with each other.

In the second step according to the process of the present invention, the dispersion is aged while controlling the pH value thereof to be lower than 10. Thus, the layers partially combine with each other by the dehydration condensation of the surface silanol groups (—O—H). In this manner, a three-dimensional structure (honey-comb structure) consisting of silicates is formed, and a composite comprising a surfactant introduced inside the three-dimensional structure (i.e., the cavity of the honey-comb structure) is obtained.

In the third step according to the process of the present invention, the surfactant is removed, and the vacant cavities which result by the removal provides the pores. Thus is obtained a high-porosity three-dimensional structure (a honey-comb structure) having a silica framework.

In the first step of the process according to the present invention in case of using a substance other than a layered silicate as the silicon-containing substance, the surfactant forms micelles (rod-like structures) arranged regularly in the aqueous solution. The silicon-containing substances aggregate around the regularly arranged surfactant.

In the second step according to the process of the present invention, the dispersion is aged while controlling the pH value thereof to be lower than 10. Thus, the silicon-containing substances are converted into silicon oxides having the hydroxyl groups (—OH groups). The hydroxyl groups (-OH groups) of a silicon oxide undergo condensation with each other to form a polymerized silicon oxide. Because the polymerization of the silicon oxide occurs around the surfactant, the polymerization product as a whole develop into a three-dimensional structure (a honey-comb structure), and a composite comprising a surfactant introduced inside the three-dimensional structure (i.e., the cavity of the honey-comb structure) is obtained as a result.

In the third step according to the process of the present invention, the surfactant is removed, and the vacant cavities which result by the removal provides the pores. Thus is obtained a high-porosity three-dimensional structure (a honey-comb structure) comprising oxides of silicon.

In case of dispersing a substance containing elements other than silicon and oxygen in addition to the substance containing silicon, or in case of using a composite substance containing silicon and an element other than silicon and oxygen as the substance containing silicon as a starting material, is obtained a high-porosity three-dimensional structure (a honey-comb structure) comprising a composite oxide containing silicon and an element other than silicon.

In case of using a starting material which is a layered silicate containing two or more layers, the layers of the layered silicate can be bent in the following manner. That is, the aqueous solution containing a surfactant dissolved therein is rendered alkaline in case of dispersing the layered silicate and aging the resulting dispersion. In this manner, the Si—O bonds in the layered silicate can be relaxed to facilitate the bending. Thus, the surfactant can enter into the interlayer space among the layers, and a three-dimensional structure (a honey-comb structure) can be developed as a whole. The resulting layered silicate is drawn out of the aqueous solution, and rinsed or dispersed in an aqueous solution whose pH is controlled to a value of lower than 10. The Si—O bonds in the layered silicate are fortified by this final treatment.

The surfactant for use in the present invention is at least one selected from the group consisting of compounds having an ammonium group as the terminal group (such as an alkyltrimethylammonium, a dimethyldialkylammonium, an alkylammonium, and benzyltrimethylammonium), compounds having a sulfate group (—O—$SO_3^-$ group) as the terminal group, compounds having a carboxyl group (—$COO^-$) as the terminal group, or compounds having a phosphate group (—O—$PO_3^-$) as the terminal group.

The first step according to the process of the present invention can be effected, for instance, by dispersing particles of a silicon-containing substance in a dilute aqueous solution of a surfactant. The concentration of the dilute aqueous solution of a surfactant for use in this case is preferably in a range of from 0.05 to 1M (represents "mol/l", hereinafter the same).

If the concentration of the aqueous solution should be lower than 0.05M, the function of the surfactant as described above may result insufficient. Such an unfavorable treatment in case of using a layered silicate as the silicon-containing substance would insufficiently expand the interlayer spacing of the layered silicate, and may lead to a failure in obtaining a surfactant/three-dimensional silicate composite. Conclusively, a three-dimensional structure requisite for the formation of pores and crystalline structure for the porous material may not be implemented.

On the contrary, if the concentration of the dilute aqueous solution is higher than 1M, a part of the surfactant may remain un-reacted in the aqueous solution and be wasted. For instance, the sites in the layered silicate for trapping the surfactant are limited, also a maximum necessary amount of the ions becomes limited.

The quantity of the silicon-containing substance to be added into the aqueous solution is preferably in the range of from 10 to 200 g with respect to 1,000 ml of a 0.1M aqueous solution of the surfactant.

If the amount of the silicon-containing substance is less than 10 g, a part of the surfactant may remain un-reacted in a manner similar to that described hereinbefore. Furthermore, because the pH value of the aqueous solution is low, more alkaline should be added in the production process. This is a factor of increasing the material cost.

If the silicon-containing substance is added in excess of 200 g, the pH value of the aqueous solution may be elevated as to increase the concentration of dissolved silicon-containing substance. This may lead to a decrease in product yield, because the amount of product yield which can be recovered from the aqueous solution may be reduced.

In the first step according to the process of the present invention, the dispersion is preferably aged until the concentration of the surfactant becomes constant.

It is preferred to heat the aqueous solution (dispersion) containing the silicon-containing substance and the surfactant during the first step of the process according to the present invention, because heating accelerates the function of the surfactant described above (for instance, the incorporation of the surfactant into the layered silicate). More specifically, the aqueous solution is preferably heated to a temperature in a range of from 40° to 100° C.

If the aqueous solution is maintained at a temperature lower than 40° C., the aging time in the first step will be longer because of the low activity of the surfactant. A special equipment such as autoclave is necessary for heating the aqueous solution to a temperature higher than 100° C. Accordingly, heating the aqueous solution to a temperature higher than 100° C. may require an extra cost for the equipment and the like. Moreover, in case of using a silicate other than the layered silicates, the heating may partially polymerize the silicate aggregates, and may partially form a surfactant/three-dimensional structure silicate composite.

The first step of the process according to the present invention requires maintaining the pH value of the dispersion to 10 or higher. If the pH value of the aqueous solution drops to lower than 10, the efficiency of the function exerted by the surfactant may decrease as to produce a porous material with inferior crystallinity. This is described in detail hereinafter.

More preferably, the pH value of the dispersion during the first step is maintained in a range of from 11 to 12.5. By maintaining the pH value of the dispersion in this range, not only a highest effect can be achieved by the surfactant, but also the dissolution of the silicon-containing substance in the aqueous solution, which is described in detail hereinafter, can be minimized.

The pH value of the aqueous solution is controlled by, for instance, properly adding a 1-N aqueous solution of sodium hydroxide. In case 50 g of Kanemite is dissolved as the layered silicate into an aqueous solution containing a 0.1M alkyltrimethylammonium solution as the surfactant, the pH value of the resulting aqueous solution is found to be 11.5. Accordingly, no further operation is necessary for the aqueous solution obtained in this manner.

In the second step which is effected subsequent to the first step according to the process of the present invention, the pH of the aqueous solution is maintained at a value lower than 10.

By effecting the second step, a composite is obtained from the surfactant and the three-dimensional structure of the silicon oxide. In the second step of the process according to the present invention, the aging of the dispersion is continued by adjusting the pH until a stable pH value is obtained.

The condensation of the silanol group, which is described in detail hereinafter, proceeds most swiftly in the neutral region, and more preferably, by elevating the temperature. Accordingly, a stubborn three-dimensional structure can be formed inside the composite by lowering the pH of the dispersion to a value lower than 10, thereby accelerating the condensation reaction. A porous material having excellent heat resistance can be obtained in this manner.

The second step of the process according to the present invention above is effected by properly adding, for example, a 2-N aqueous solution of hydrochloric acid. More preferably, the aqueous solution is maintained in a pH range of from 6 to 8.5.

If the pH of the aqueous solution is lower than 6, the surfactant undergoes substitution by $H^+$. This would lead to structural shrinking of the layered structure, which causes shrinking of interlayers or vacant cavities prior to the formation of the three-dimensional structure, and would destroy the pores.

The condensation of the silanol groups can be further accelerated by maintaining the temperature of the aqueous solution at 50° C. or higher during the second step of the present process.

In case of maintaining the solution to a temperature of 50° C. or higher, the solution is preferably kept at the temperature for a duration of 3 hours or longer. If the duration of maintaining the solution at a temperature of 50° C. or higher is less than 3 hours, the condensation of the silanol groups may be completed only insufficiently. This may lead to an unstable formation of the three-dimensional structure.

The third step of the process according to the present invention is effected after subjecting the dispersion to filtration and drying the filtrate.

That is, this step comprises removing the surfactant from the composite. The surfactant can be removed by calcining the composite, or by subjecting the composite to ion-exchange treatment.

The surfactant is decomposed or burned off by calcination.

The calcination is carried out preferably at a temperature in a range of from 500° to 1,000° C. If the calcination should be effected at a temperature lower than 500° C., the surfactant would be insufficiently combusted. The surfactant would then remain inside the pores as residual carbon and the like. If the calcination should be effected at a temperature higher than 1,000° C., on the other hand, the three-dimensional structure, i.e., the crystal structure of the porous material, may collapse as to impair the crystallinity and the like of the resulting porous material.

In case of effecting ion-exchange treatment, the surfactant inside the composite is removed by ion-exchanging the surfactant inside the composite with protons ($H^+$). The protons ($H^+$) remain inside the cavities (pores) which generate by removing the surfactant, however, considering that the ion radius of the protons is as small as 0.1 nm or less, the protons in the mesoporous material thus obtained cannot clog the pore, because they are sufficiently small as compared with the pores having a diameter in a range of from 1.5 to 10 nm.

This step of ion-exchange can be effected by immersing the composite above into an acidic solution. For instance, the composite can be immersed into an ethanol solution of hydrochloric acid. In this manner, the surfactant inside the composite can be ion-exchanged by protons ($H^+$) supplied from hydrochloric acid.

Silicate is converted into silicon oxide by calcining in the third step to obtain the porous material of silicon oxide. Silicate remains as it is by ion-exchange treatment in the third step to obtain the porous material of silicate.

It is preferred to carry out a step to remove the water-soluble component from the aqueous solution between the first and the second aging steps of the process according to the present invention.

The step above is optionally necessary, because a part of the water-soluble component of the silicon-containing substance produces silicate ions during the first step of the present process.

That is, the silicate ions thus formed tend to generate amorphous silica gel precipitate as the pH value of the aqueous solution approaches the neutral range. Silica gel is poorly crystalline, and has no uniform pores. If silica gel should be included in the composite, the crystallinity of the entire porous material may be impaired. It is therefore preferred to remove the water-soluble component which may precipitate to form silica gel and the like.

Specifically, the step for removing the water-soluble component is carried out, for example, in a manner described below. After the first step is completed, the solid matter (i.e., in case the starting material is a layered silicate, a composite of surfactant and the silicate; in case the starting material is a silicon-containing substance other than a layered silicate, a composite of surfactant and the aggregate of the silicon-containing substance) is separated from the aqueous solution. The solid matter thus separated from the aqueous solution is dispersed again in distilled water to provide a dispersion. The dispersion is then subjected to the second step described above to maintain the pH of the dispersion to a value lower than 10.

The solid matter can be separated from the aqueous solution by, for instance, filtration or centrifugation.

A porous material further improved in quality can be obtained by subjecting the aqueous solution to the aforementioned second step and the step of removing water-soluble components. The high quality porous material thus obtained is useful as, for instance, catalyst support for purification of exhaust gases, catalyst support for liquefaction of organic polymers, catalyst support for petroleum refining, methane-storage materials, adsorbent for recovery of various solvent vapors, adsorbent for canisters, or humidity controlling material.

EXAMPLE 1

The present example refers to a case in which surfactant is incorporated into a layered silicate by effecting a first step. The crystallinity, the composition, etc., of a surfactant/three-dimensional silicate composite are explained below with reference to Table 1 and FIGS. 1 and 2. In the present example, samples according to the present invention are prepared, and the characteristics thereof are compared with those of the comparative samples.

The samples according to the present invention and the comparative samples were prepared in the following manner.

A layered silicate, Kanemite, was synthesized by calcining a sodium silicate powder containing $SiO_2$ and $Na_2O$ at a ratio ($SiO_2/Na_2O$) by molar of 2 at 700° C. for a duration of 6 hours to obtain crystals of $\delta\text{-}Na_2Si_2O_5$.

Fifty grams of $\delta\text{-}Na_2Si_2O_5$ thus obtained was dispersed in distilled water to obtain a dispersion, and the resulting dispersion was stirred for 3 hours. Wet Kanemite was recovered from the dispersion by filtration.

The wet Kanemite was then dispersed in a 1,000-ml portion of a 0.1M aqueous solution of a surfactant, i.e., hexadecyltrimethyl-ammonium chloride. The dispersion thus obtained was heated at 70° C. for a duration of 3 hours to effect the process for the first step.

During the first step, the pH of the dispersion was kept at a constant value as described hereinafter. The pH was adjusted by adding dropwise an aqueous 1-N sodium hydroxide solution or an aqueous 2-N hydrochloric acid solution to the dispersion, if necessary.

The dispersion was then cooled to room temperature.

Subsequently, the step of removing the water-soluble component was carried out. More specifically, the composite thus formed in the dispersion was separated by filtration.

The second step was conducted thereafter. A dispersion was prepared by dispersing the composite above in a 1,000-ml portion of ion-exchanged water, and the pH value thereof was adjusted to 8.5 by adding dropwise an aqueous 2N hydrochloric acid solution.

The composite was recovered again by filtration, and was washed repeatedly with ion-exchanged water. The composite was air-dried to obtain a desired sample.

Samples F1 to F3 and comparative samples CF1 and CF2 were each obtained in approximately the same manner as described above, except for the difference in the pH value of the dispersion in the first step. More specifically, sample F1 was obtained by maintaining the pH at 12.3; similarly, samples F2 and F3 were each obtained at a pH of 11.5 and 10, respectively. Comparative samples CF1 and CF2 were each obtained by maintaining the pH of the dispersion at 8.5 and 7, respectively, during the first step.

The crystallinity of the samples and the comparative samples was evaluated by means of powder X-ray diffraction (XRD) and $^{29}Si$ Magic Angle Solid-state Nuclear Magnetic Resonance ($^{29}SiMASNMR$) spectroscopy. The results are given in FIGS. 1 and 2. The chemical composition of the Samples and the Comparative samples is obtained as shown in Table 1.

The XRD patterns of the samples were obtained by using RAD-B diffractometer (manufactured by Rigaku Corporation) operating with Cu K$\alpha$ radiation scanned at a rate of 2° (2θ)/minute. The RAD-B diffractometer was equipped with a 1°—0.3 mm—1° slit system.

The X-ray diffractograms thus obtained are given in FIG. 1, in which the abscissa represents the diffraction angle, and the ordinate represents the diffraction intensity (arbitrary unit).

For samples F1 to F3, diffractograms with their intensities magnified by 4 times are also inserted to make the peak more distinct. They are indicated each with the number of the sample followed by "(×4)" in FIG. 1. The diffraction peaks can be identified by the Miller Indices attached thereto.

It can be seen clearly from FIG. 1 that the samples F1 to F3 according to the present invention yield a diffraction pattern assigned to a crystallographic hexagonal structure. In contrast to the case for the samples of the present invention, no peaks are identified in the diffractograms of the comparative examples CF1 and CF2. The comparative samples CF1 and CF2 are therefore identified as amorphous phases.

It can be understood that crystalline layered silicates are formed more readily by maintaining the aqueous solution in the first step at a pH of 10 or higher.

The $^{29}$Si Magic Angle Solid-state Nuclear Magnetic Resonance ($^{29}$SiMASNMR) spectra were obtained by using a MASNMR spectrometer MSL-300WB (manufactured by Bruker Co., Ltd.) operated at a rotation frequency of 4 KHz and a pulse width of 90 seconds.

Figure 2:
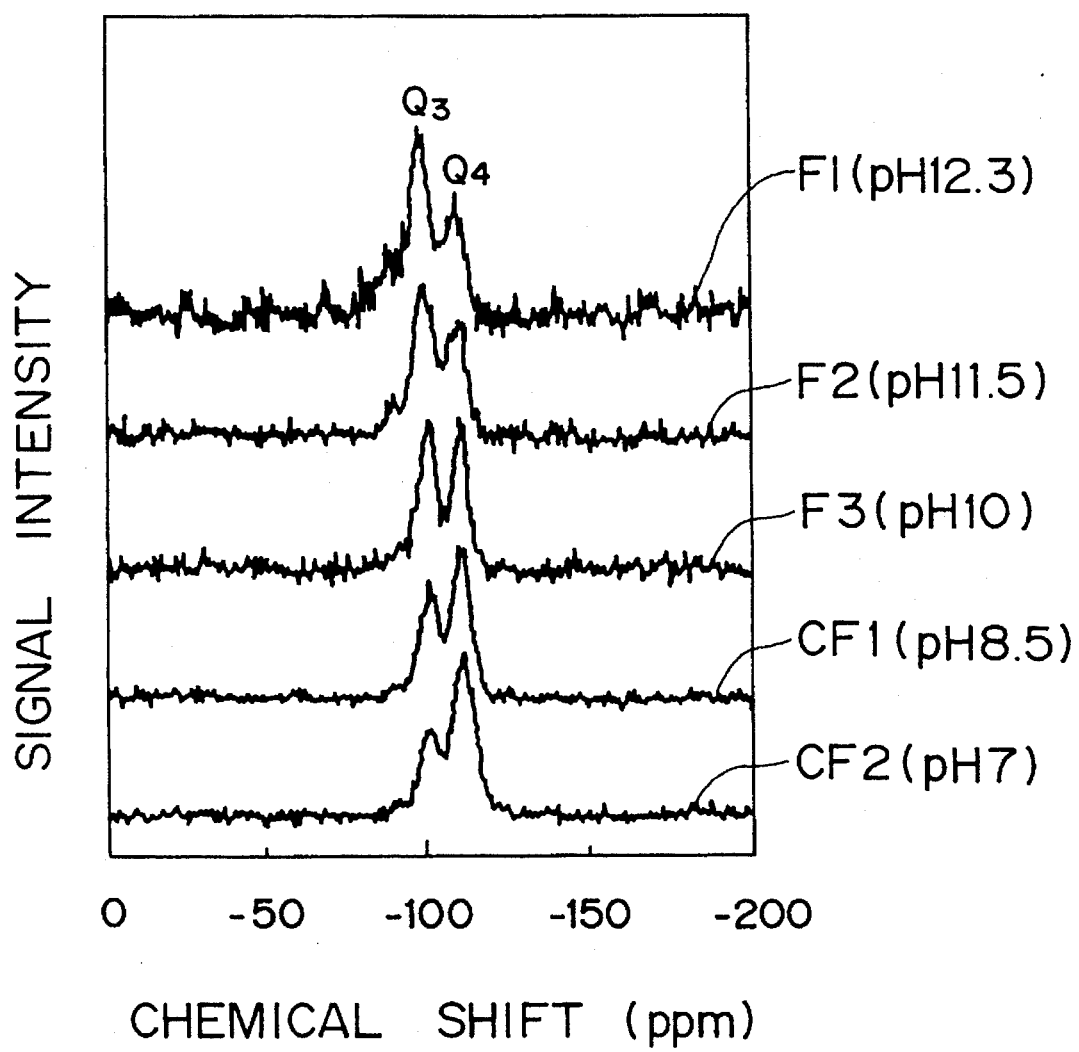
FIG. 2 is a diagram showing $^{29}$Si nuclear magnetic resonance spectra for each of the samples and comparative samples obtained in Example 1.

The spectra thus obtained are shown in FIG. 2, in which the abscissa represents chemical shift, and the ordinate represents the signal intensity.

A doublet is clearly observed for the samples F1 to F3 and the comparative samples CF1 and CF2. The peak indicated with $Q^3$ on the left-hand side is assigned to free $SiO_4$ tetrahedra [O$\underline{Si}$(OSi≡)$_3$], and that indicated with $Q^4$ on the right-hand side is assigned to $SiO_4$ tetrahedra formed by the condensation of silicates [$\underline{Si}$(OSi≡)$_4$]. Kanemite yields a single peak $Q^3$ on its NMR spectrum.

Referring to FIG. 2, samples F1 and F2 each yield a doublet in which the peak $Q^3$ is more intense than the peak $Q^4$. Sample F3 yields a doublet in which the peaks $Q^3$ and $Q^4$ are approximately of the same intensity. However, the comparative samples CF1 and CF2 yield doublets in which the peak $Q^4$ is found to be more intense than the peak $Q^3$.

Thus, it is indicated from the results above that by maintaining the pH of the aqueous solution in the first step at 10 or higher, the interlayer-bonded (condensed) portions (assigned to peak $Q^4$) are present at the minimum-possible amount of sites necessary for forming a three-dimensional framework, whereas the portions which yield the pores upon calcination (peak $Q^3$) are increased effectively by the substitution of the surfactant.

The results obtained for samples F1 to F3 and comparative samples CF1 and CF2 by chemical analysis are given in Table 1. The chemical composition of the samples F1 to F3 and the comparative samples CF1 and CF2 are given by the concentration of carbon, hydrogen, and nitrogen in terms of percentage by weight, and each of the samples was further combusted at a temperature of 960° C. to measure the residual ash content. From the results thus obtained, the ion-exchange ratio, i.e., the molar ratio of the surfactant and the three-dimensional structure, was calculated. More specifically, the quantity of the surfactant is obtained from the total content of carbon, hydrogen, and nitrogen, while $SiO_2$ is obtained from the ash content.

Table 1 clearly indicates that the ion-exchange ratio is higher for the samples F1 to F3 as compared with that for the comparative samples CF1 and CF2. It is therefore presumed from the present results and the results obtained in the above analysis concerning the crystallinity that a composite is amorphous in case the ion exchange ratio is low.

TABLE 1

| Sample Nos. | | % by weight | | | | Molar (1)/(2)* ratio |
| --- | --- | --- | --- | --- | --- | --- |
| | | C | H | N | Ash content | |
| Samples | F1 | 40.84 | 8.12 | 2.45 | 35.01 | 0.308 |
| | F2 | 38.57 | 7.90 | 2.37 | 39.21 | 0.259 |
| | F3 | 32.46 | 6.70 | 2.00 | 48.08 | 0.178 |
| Comparative samples | CF1 | 17.34 | 3.71 | 1.01 | 66.03 | 0.069 |
| | CF2 | 15.69 | 3.45 | 0.94 | 68.88 | 0.060 |

*(1)/(2) ratio: ((surfactant)/SiO2) ratio by molar

EXAMPLE 2

The present example shows the effect of heating during the second step on the crystallinity of the porous material. The present example is described in reference with FIGS. 3 and 4.

Sample T4 was prepared first in the following manner. Five grams of the composite obtained as sample F1 in Example 1 was dispersed in 100 ml of water to obtain a dispersion. The resulting dispersion was then heated at 80° C. for a duration of 3 hours. After the heat treatment, the composite was drawn from the dispersion and dried. The dried composite was calcined thereafter in air at 550° C. for a duration of 6 hours. Thus a porous material was obtained as sample T4.

Separately, a porous material as sample T3 was prepared by simply drying, and calcining the sample F1 obtained in Example 1 in the same manner as in the preparation of sample F4.

The sample T4 and the sample T3 obtained above were subjected to powder X-ray diffraction and the measurement of a nitrogen adsorption/desorption isotherms was conducted at a temperature of −196° C.

Figure 3:
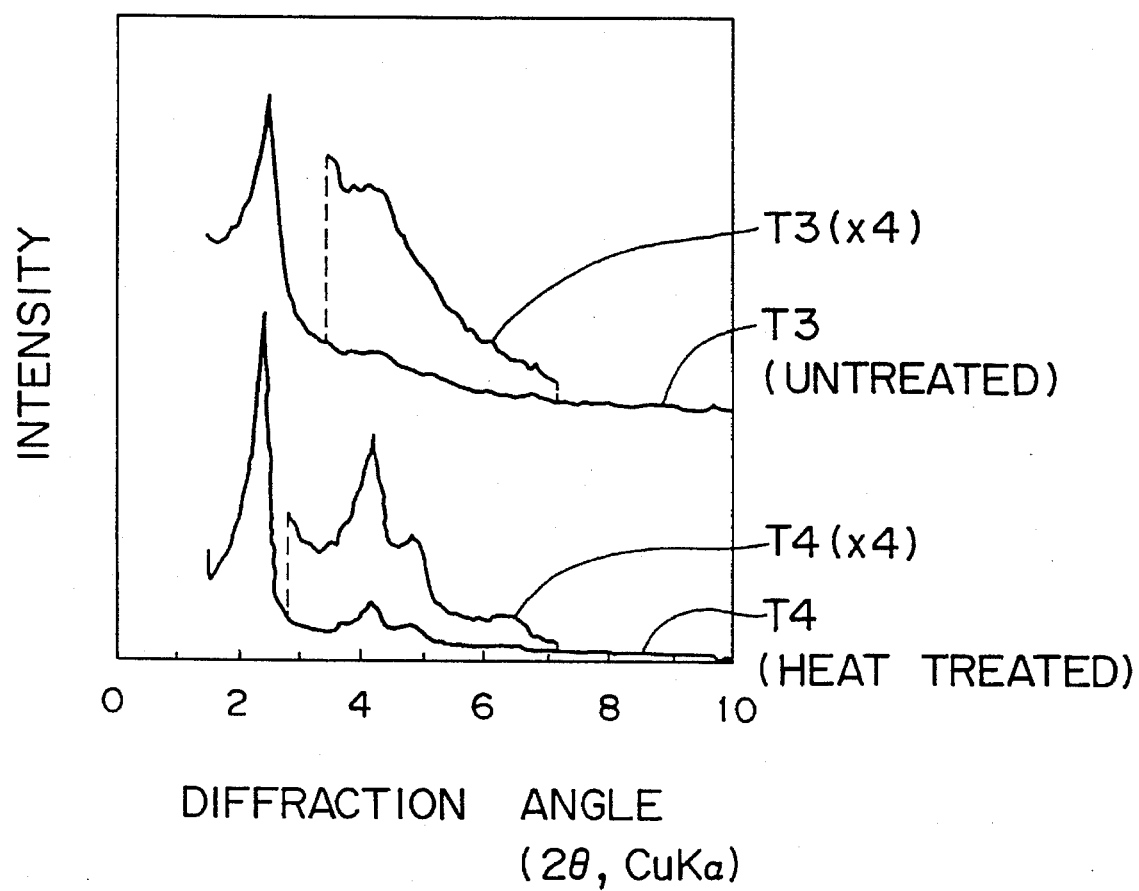
FIG. 3 is a diagram showing the powder X-ray diffraction patterns for each of the samples and comparative samples obtained in Example 2.

Powder X-ray diffraction was conducted in the same manner as in Example 1, and the results are given in FIG. 3. Thus, the sample T4 according to the present invention was identified as a crystalline phase having a crystallographic hexagonal structure, and was found to yield a sharp diffraction pattern with superior crystallinity. The sample T3 was also identified as a crystalline phase having a crystallographic hexagonal structure, but it was found to yield a broader diffraction pattern than that of T4.

It can be seen from the foregoing that a porous material with improved crystallinity can be obtained by heating the aqueous solution in the second step.

Figure 4:
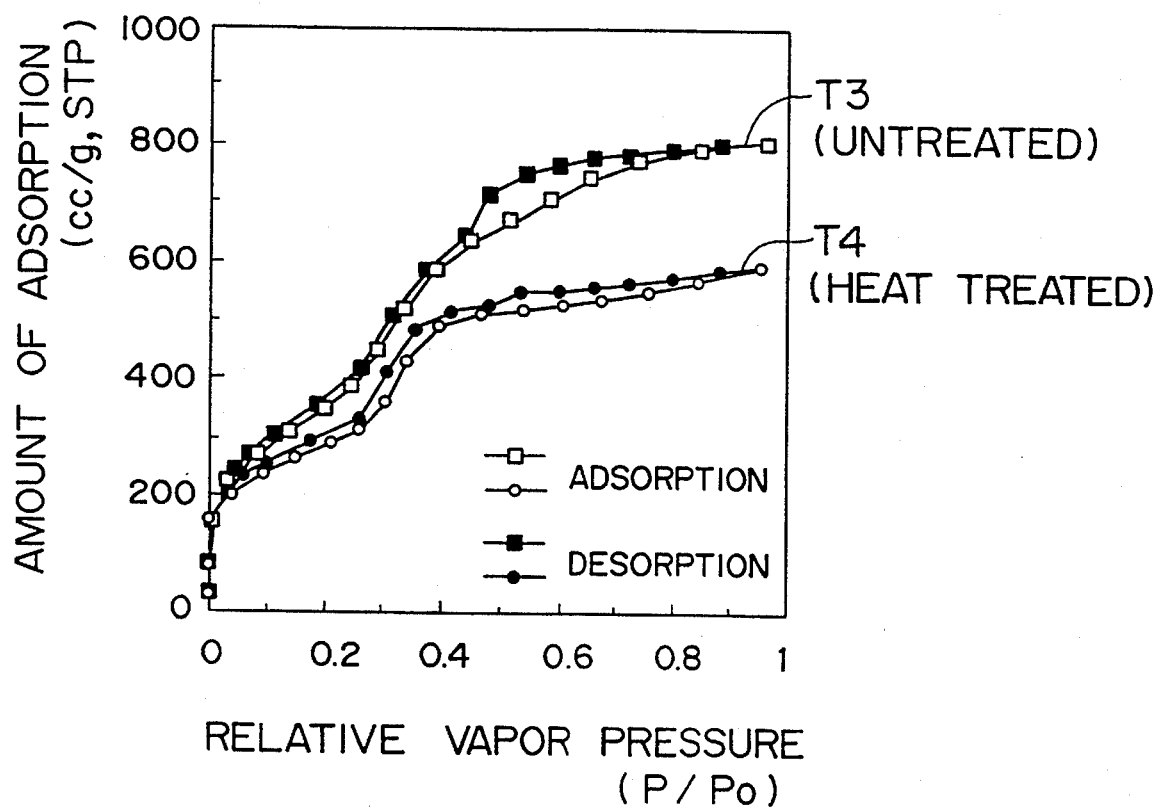
FIG. 4 is a diagram showing the nitrogen adsorption-desorption isotherms for each of the samples and comparative samples obtained in Example 2.

The nitrogen gas adsorption/desorption isotherms were obtained by a capacity method by using vacuum line equipment. The isotherms thus obtained are shown in FIG. 4. The ordinate of the graph represents the amount of adsorption [the volume (cc) of nitrogen gas adsorbed per unit weight of the porous material (g) (as reduced to the quantity under standard state, STP; i.e., at a temperature of 25° C. and under a pressure of 1 atm)], and the abscissa represents the relative vapor pressure (P/P$_0$, where P represents the vapor pressure of nitrogen and P$_0$ represents the saturated vapor pressure of nitrogen at −196° C.).

Referring to FIG. 4, the nitrogen adsorption/desorption isotherm for the sample T4 shows an abrupt rise at a P/P$_0$ of 0.3. This abrupt change in the isotherm is known as capillary condensation phenomenon in the pores by the nitrogen gas of sample T4 at a relative pressure P/P$_0$ of 0.3. The superiority of sample T4 concerning the crystallinity and the uniformity of the pores can be evidenced by the occurrence of this phenomenon. In contrast to the isotherms of sample T4, the adsorption/desorption isotherms of the sample T3 yields a larger gradient. It can be seen therefrom that the crystallinity and the uniformity in pore size for sample T4 are superior to those of sample T3.

Conclusively, a porous material having improved crystallinity and uniform pore size can be obtained by incorporating a heat treatment in the second step in the process for producing the porous material.

EXAMPLE 3

Figure 5:
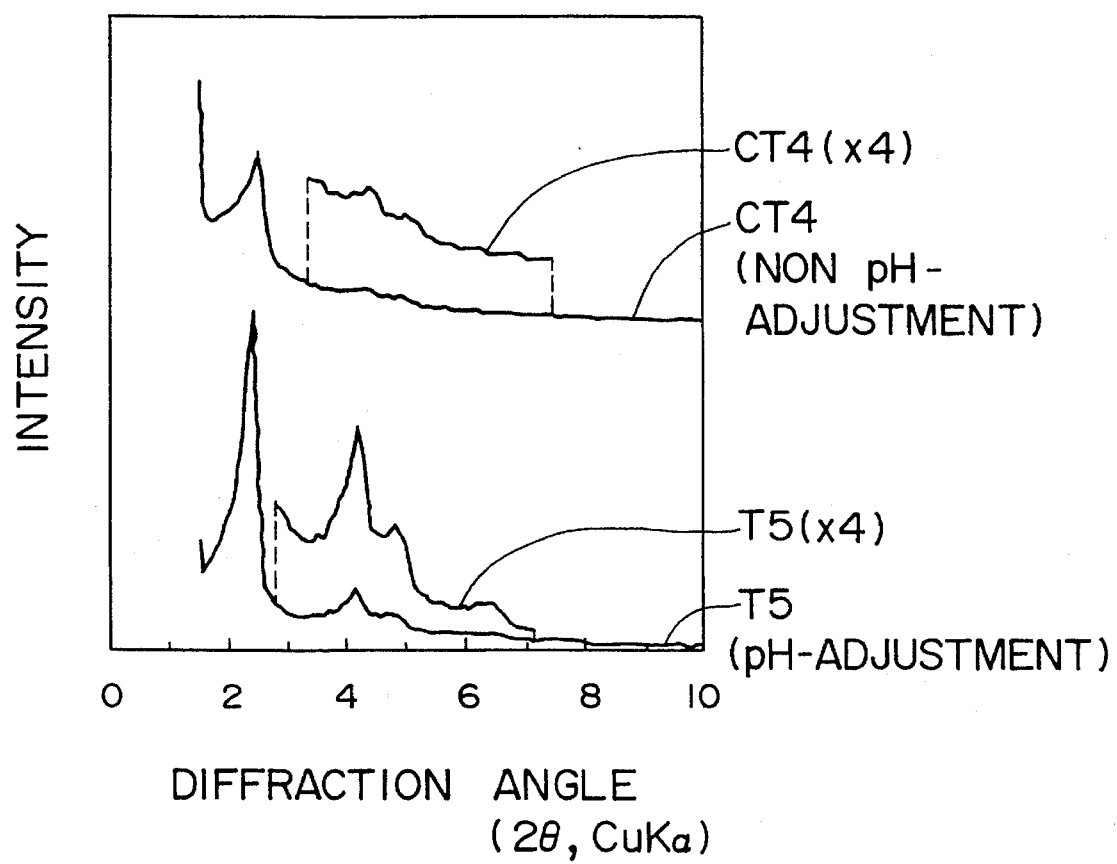
FIG. 5 is a diagram showing the powder X-ray diffraction patterns for each of the samples and comparative samples obtained in Example 3.
Figure 6:
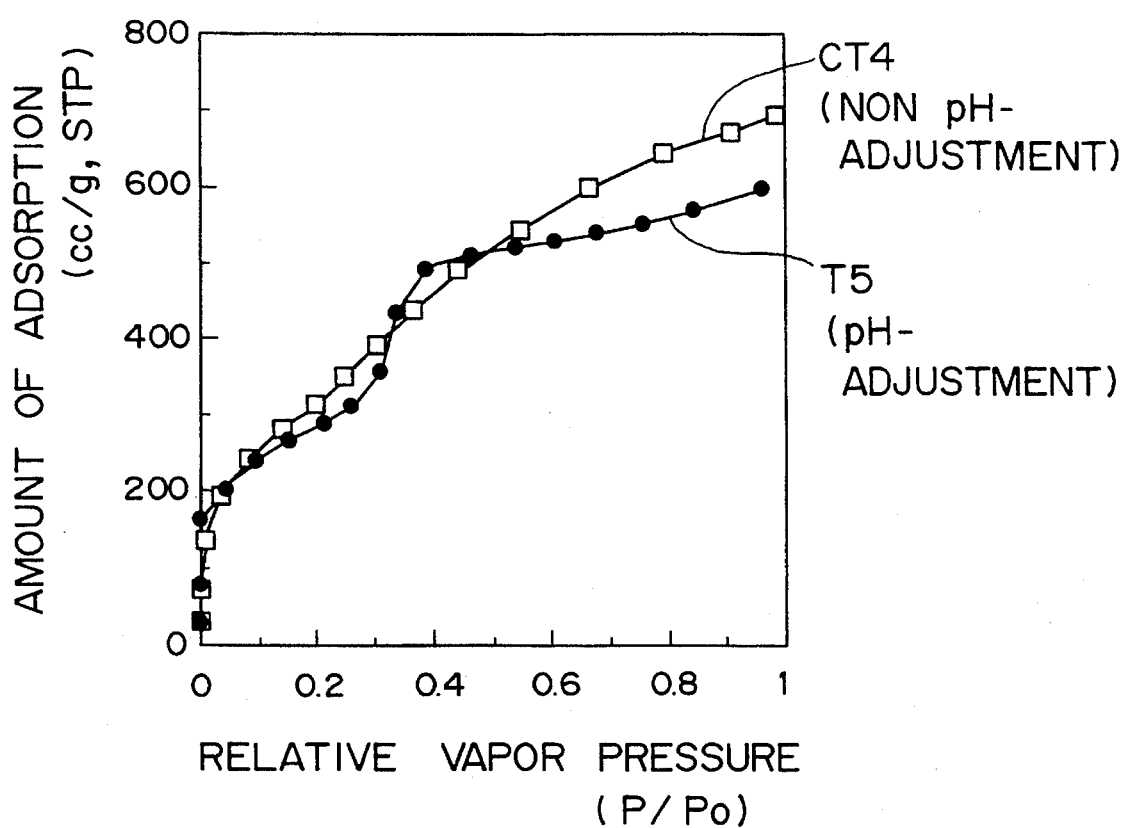
FIG. 6 is a diagram showing the nitrogen adsorption isotherms for each of the samples and comparative samples obtained in Example 3.

Referring to FIGS. 5 and 6, the difference in crystallinity of the porous material is discussed in relation with the presence or absence of the second step.

A porous material, sample T5, according to the present invention was prepared in the manner described below.

Five grams of the composite obtained as sample F1 in Example 1 was dispersed in 100 ml of water to obtain a dispersion. The resulting dispersion was then heated at 80° C. for a duration of 3 hours. After the heat treatment, the composite was drawn from the dispersion and dried. The dried composite was calcined thereafter in the same manner as in Example 2. Thus a porous material was obtained as sample T5.

Separately, a comparative sample was obtained in the same manner as for sample F1 in Example 1 except that the second step was omitted. A porous material as comparative sample CT4 was prepared by simply drying and calcining the resulting sample in the same manner as in the preparation of sample T5.

Sample T5 and comparative sample CT4 obtained above were subjected to powder X-ray diffraction and the measurement of a nitrogen adsorption/desorption isotherms.

Powder X-ray diffraction was conducted in the same manner as in Example 1, and the results are given in FIG. 5. Thus, sample T5 according to the present invention was identified as a crystalline phase having a crystallographic hexagonal structure. Comparative sample CT4, however, yields a broad diffraction pattern with no peaks, indicating that the sample is amorphous.

The nitrogen gas adsorption/desorption isotherms were obtained in the same manner as in Example 2. The isotherms thus obtained are shown in FIG. 6. Referring to FIG. 6, the nitrogen adsorption/desorption isotherm for sample T5 shows a distinguished abrupt rise at a $P/P_0$ of 0.3. It can be seen that sample T5 yields superior crystallinity and uniformity in pore size.

In contrast to the isotherms of sample T5, the adsorption/desorption isotherms of comparative sample CT4 yields a larger gradient. It can be seen therefrom that the crystallinity and the uniformity in pore size for comparative sample CT4 are inferior to those of sample T5.

Conclusively, a porous material having improved crystallinity and uniform pore size can be obtained by incorporating a second step in the process for producing the porous material.

EXAMPLE 4

Figure 7:
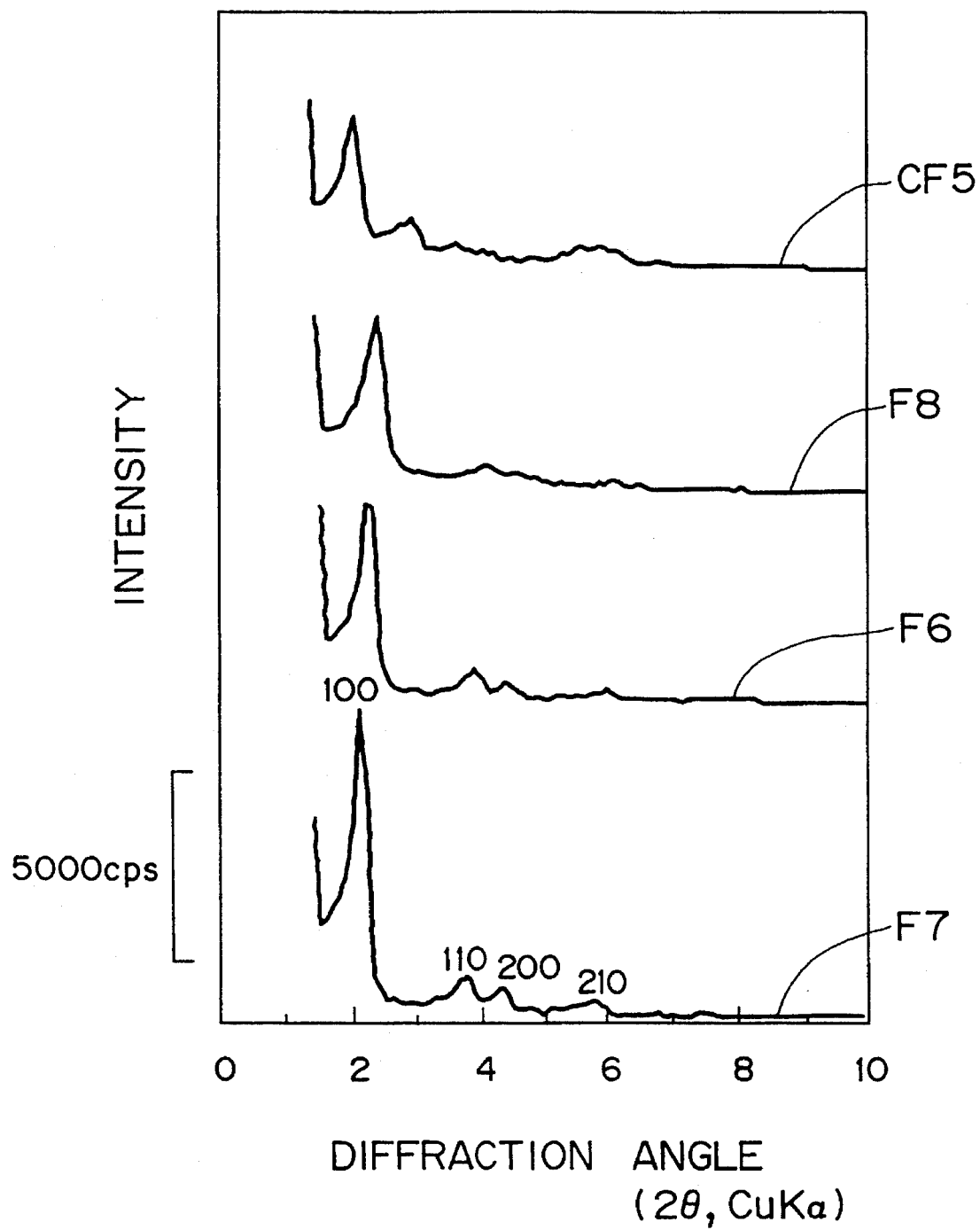
FIG. 7 is a diagram showing the powder X-ray diffraction patterns for the samples and comparative samples obtained in Example 4.
Figure 8:
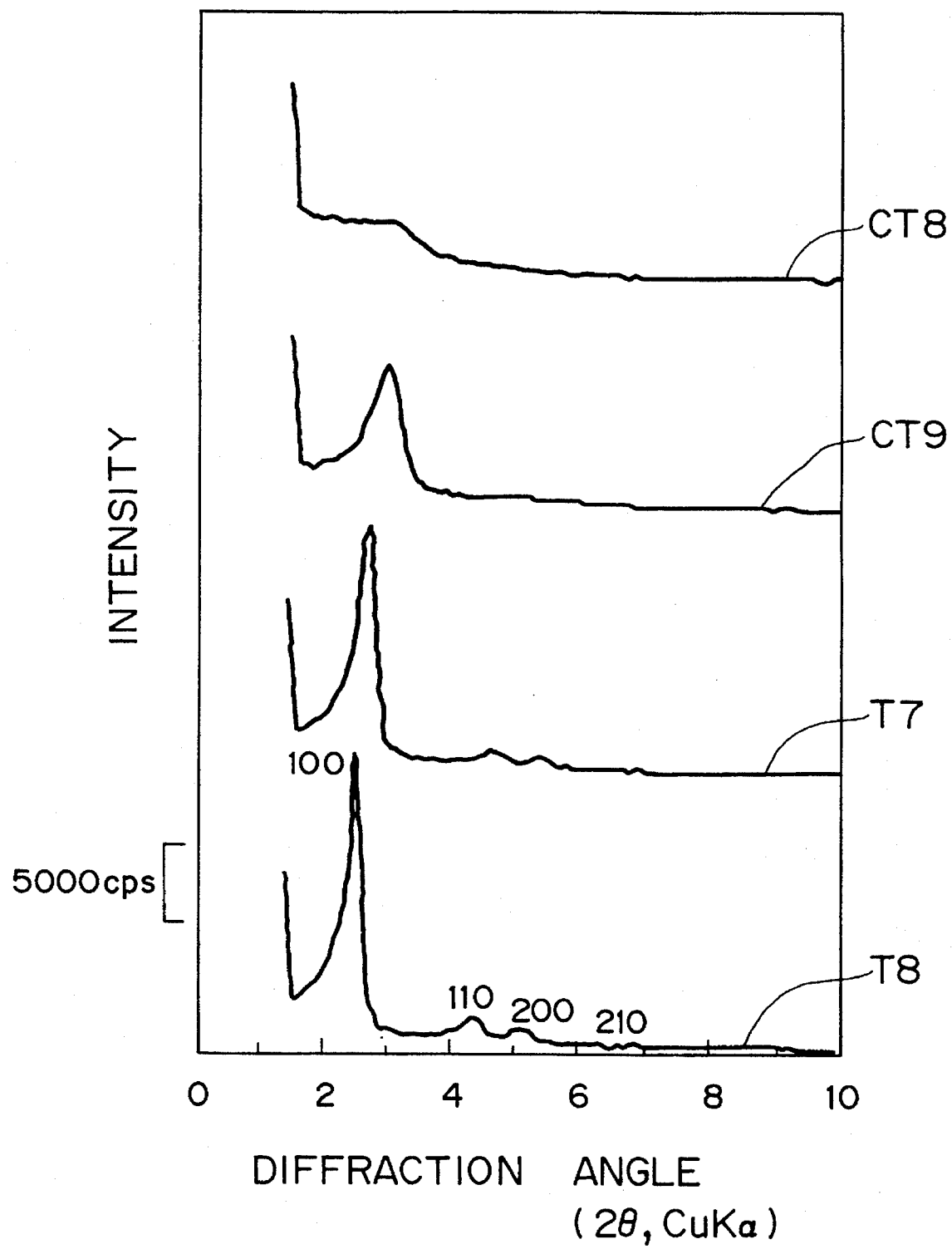
FIG. 8 is a diagram showing the powder X-ray diffraction patterns for the samples and comparative samples obtained in Example 4.

Referring to FIGS. 7 and 8, the difference in crystallinity of the composite and the porous material is discussed in relation to the temperature conditions during the second step.

Samples F6 and F7 according to the present invention and comparative samples CF5 and CF6 were prepared in the manner described below.

Samples F6 and F7 according to the present invention were prepared by a process comprising a step of adjusting the pH of the dispersion containing the composite of sample F1 to 8.5, followed by heat-treating the resulting dispersion at 70° C. for a duration of 3 hours and 48 hours, respectively.

Sample F8 was prepared by a process comprising adjusting the pH of the dispersion containing the composite of sample F1 to 8.5, and then allowing the resulting dispersion to stand at 25° C. for a duration of 3 hours.

The comparative sample CF5 was obtained in the same manner as sample F1, except that the second step was omitted.

Samples F6, F7 and F8 as well as comparative sample CF5 were subjected to powder X-ray diffraction in the same manner as in Example 1. The results are shown in FIG. 7. The scale shown in the ordinate of the graph corresponds to an intensity of 5,000 cps (counts per second).

Referring to FIG. 7, samples F6, F7 and F8 according to the present invention are identified as crystalline phases having a crystallographic hexagonal structure. Comparative sample CF5, however, yields a diffraction pattern differing from the hexagonal pattern.

Samples F6, F7 and F8 as well as comparative sample CF5 were then washed four times using an ion-exchanged water, and then calcined at 900° C. for a duration of 6 hours. Thus porous materials T7, T8 and T9 were obtained from samples F6, F7 and F8, and a porous material CT8 from comparative sample CF5. The resulting samples were then subjected to powder X-ray diffraction to yield FIG. 8.

Referring to FIG. 8, samples T7, T8 and T9 clearly yield a diffraction pattern assigned to a crystallographic hexagonal structure with peaks.

On the other hand, no peak is identified in the diffraction pattern of comparative sample CT8; it yields broad pattern indicating that it is amorphous or layered.

Conclusively, the development of the three-dimensional structure within the composite is accelerated by incorporating a heat treatment in the second step according to the present invention. Thus, by calcining the composite with a well-developed three-dimensional structure, a porous material with improved crystallinity can be obtained.

EXAMPLE 5

Figure 9:
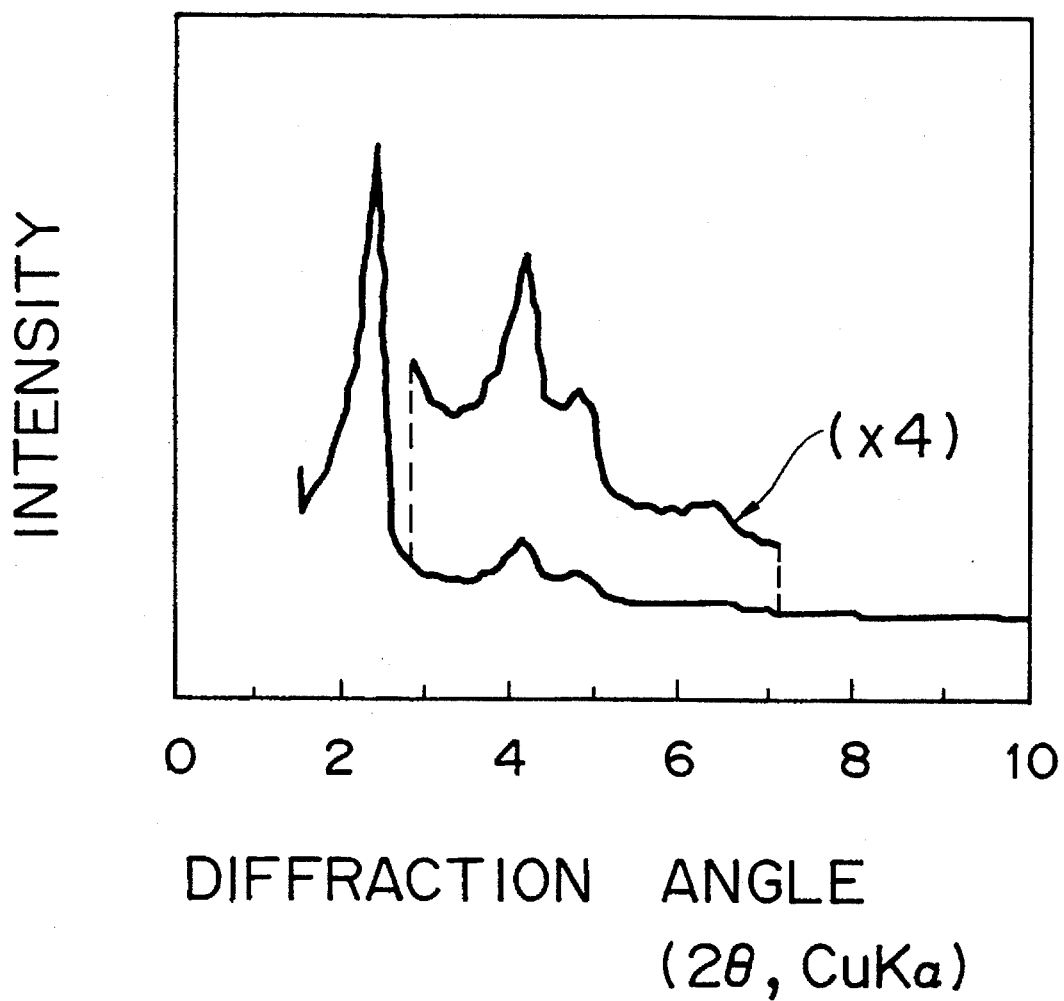
FIG. 9 is a diagram showing the powder X-ray diffraction pattern for the porous material obtained in Example 5.
Figure 10:
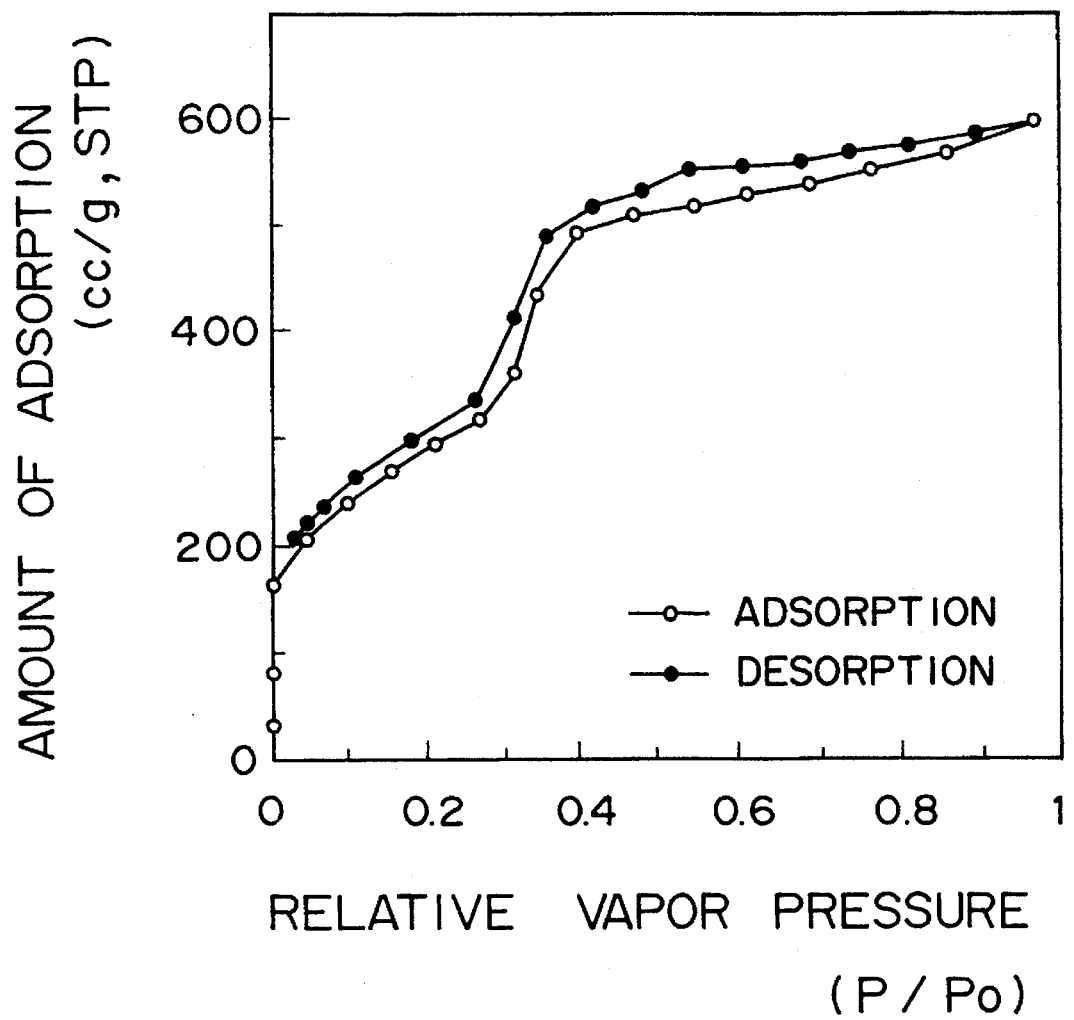
FIG. 10 is a diagram showing the nitrogen adsorption-desorption isotherm for the porous material obtained in Example 5.

Referring to FIGS. 9 and 10, the crystallinity of a porous material produced by a process differing from that employed in Example 1 is evaluated.

The process differing from that described in Example 1 is explained below.

Kanemite was synthesized by calcining a sodium silicate powder containing $SiO_2$ and $Na_2O$ at a molar ratio ($SiO_2/Na_2O$) of 2 at 700° C. for a duration of 6 hours in an electric furnace to obtain crystals of $\delta\text{-}Na_2Si_2O_5$.

Four thousand grams of $\delta\text{-}Na_2Si_2O_5$ thus obtained was size-reduced by using a Henschel mixer to obtain a pulverized product. The resulting powder was dispersed in 40 ml of ion-exchanged water to obtain a dispersion, and the resulting dispersion was stirred for 3 hours. Wet Kanemite was recovered from the dispersion by filtration using a filter press.

The wet Kanemite was then dispersed in a 60-1 portion of an aqueous solution containing 2,000 g of hexadecyltrimethylammonium chloride to obtain a dispersion of pH 12.3. The dispersion thus obtained was placed inside a 80-1 volume special reaction vessel, and was heated at 70° C. Two hours after the initiation of the heating, an aqueous 2-N hydrochloric acid solution is added into the dispersion to lower the pH of the dispersion to 8.5. The dispersion is further heated for a duration of 5 hours. Upon completion of the heating, the dispersion was allowed to stand at room temperature for a duration of 12 hours.

Subsequently, the solid matter was separated from the cooled dispersion using a filter press. The thus-recovered solid matter was dispersed in & 60-1 portion of water and stirred. After repeating the dispersion and the recovery of the solid matter four times using a filter press, the solid matter finally obtained was dried by blowing hot air with hot-air dryer for two days.

The thus dried solid matter was charged into a debindering furnace to effect debindering in gaseous nitrogen. The debindering was effected by elevating the temperature inside the furnace to 450° C. at a rate of 20° C./hour, and then maintaining the solid matter at that temperature for a duration of 3 hours.

A porous material according to the present example was finally obtained by calcining the solid matter after the debindering treatment at 550° C. for a duration of 6 hours.

The crystallinity of the porous material obtained in the present example was evaluated by subjecting the porous material to powder X-ray diffraction and the measurement of the nitrogen adsorption/desorption isotherms in the same manner as in Example 1 and Example 2, respectively. The results are shown in FIG. 9 (powder X-ray diffractogram) and in FIG. 10 (nitrogen absorption/desorption isotherms).

Referring to FIG. 9, the porous material according to the present example is identified as a crystalline phase having a crystallographic hexagonal structure. Referring to FIG. 10, a distinguished abrupt rise at a $P/P_0$ of 0.3 is observed in the nitrogen adsorption/desorption isotherm for the present sample. It can be seen therefore that the present sample yields superior crystallinity and uniformity in pore size.

EXAMPLE 6

50 g or 25 g of an amorphous sodium silicate (Japan Chemical Industry: a sodium silicate powder, $SiO_2/Na_2O=2.00$) were dispersed in 1,000-ml of a 0.1M aqueous solution of hexadecyltrimethylammonium chloride to obtain dispersions of pH 12.0. While stirring, the dispersions were heated at 70° C. for a duration of 3 hours. The resulting dispersions were adjusted to be pH 8.5 by adding an aqueous 2-N hydrochloric acid solution, further heated at 70° C. for a duration of 3 hours, and cooled to room temperature. The thus obtained solid product was filtered, dispersed in a 1,000 ml of ion-exchanged water, stirred for approximately 5 minutes, and then filtered again. This operation of dispersion and filtration was repeated five times. Two types of sample powders according to the present example were finally obtained by calcining the resulting product at 550° C. after drying.

Figure 11:
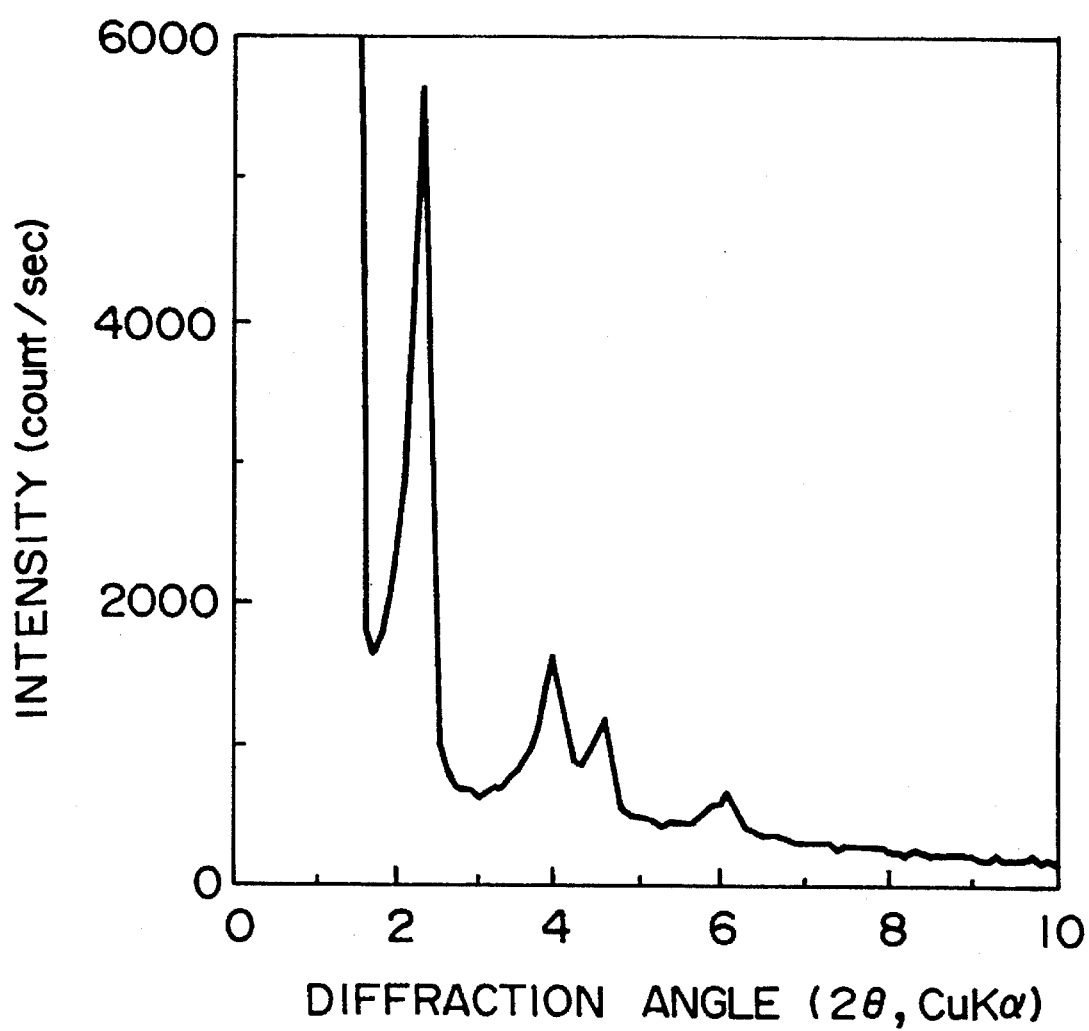
FIG. 11 is a diagram showing the powder X-ray diffraction pattern for the porous material obtained in Example 6.

These two sample powders showed nearly the same powder X-ray diffraction patterns with each other. The results are given in FIG. 11. Referring to the figure, four diffraction peaks were identified as a hexagonal structure. From this, it is confirmed that these samples yield a honeycomb structure with superior crystallinity. It is found that these sample powders have high heat resistance, because these peaks are observed until 900° C. Moreover, the surface areas of the powders were calculated by BET equation (Brunauer-Emmett and Teller's equation) from the nitrogen adsorption to the samples. The powder made from 50 g of a sodium silicate was found to have the high BET surface area of 1,443 $m^2/g$

EXAMPLE 7

The present example refers to a case in which surfactant is removed from a composite by effecting an ion-exchange process. The composite was prepared by excluding the steps of degreasing and calcination according to the process described in Example 5. A 1-g portion of the composite was dispersed in a mixed solution containing 3.8 g of a 36% aqueous hydrochloric acid solution and 150 $cm^3$ of ethanol. While stirring, the dispersion was heated at 50° C. for a duration of 6 hours. The solid product was recovered from the resulting dispersion by filtration. The resulting product was dispersed again in a mixed solution containing 3.8 g of a 36% aqueous hydrochloric acid solution and 150 $cm^3$ of ethanol, and was heated at 50° C. for a duration of 6 hours while stirring. The product recovered by filtration from the resulting dispersion was further again dispersed in a mixed solution containing 3.8 g of a 36% aqueous hydrochloric acid solution and 150 $cm^3$ of ethanol, which was heated at 50° C. for a duration of 6 hours while stirring to recover the resulting product therefrom by filtration.

Figure 12:
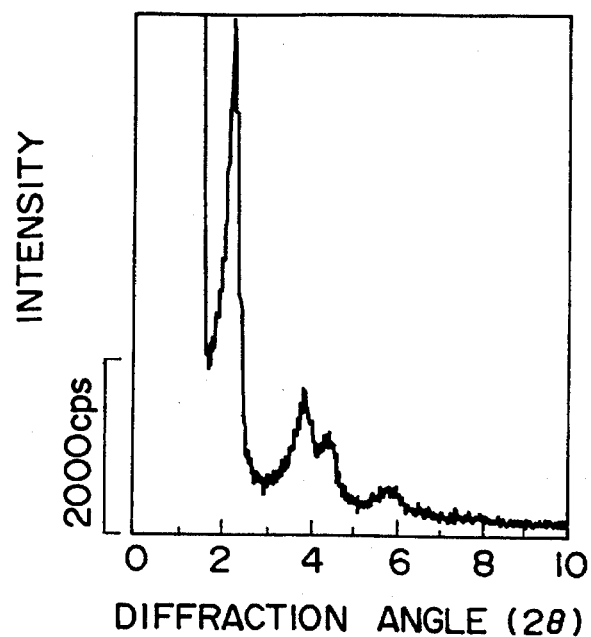
FIG. 12 is a diagram showing the powder X-ray diffraction pattern for the porous material obtained in Example 7.
Figure 13:
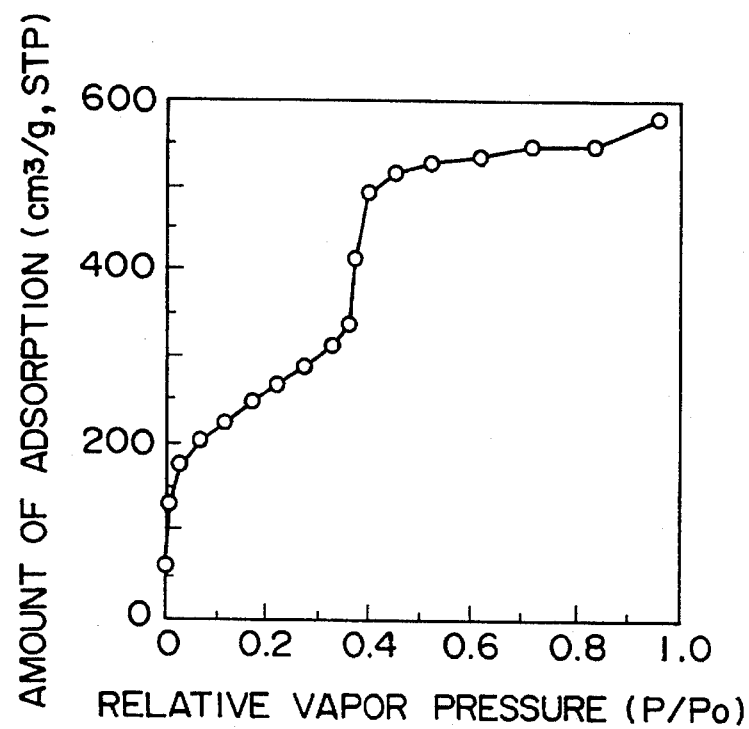
FIG. 13 is a diagram showing the nitrogen adsorption isotherm for the porous material obtained in Example 7.
Figure 14:
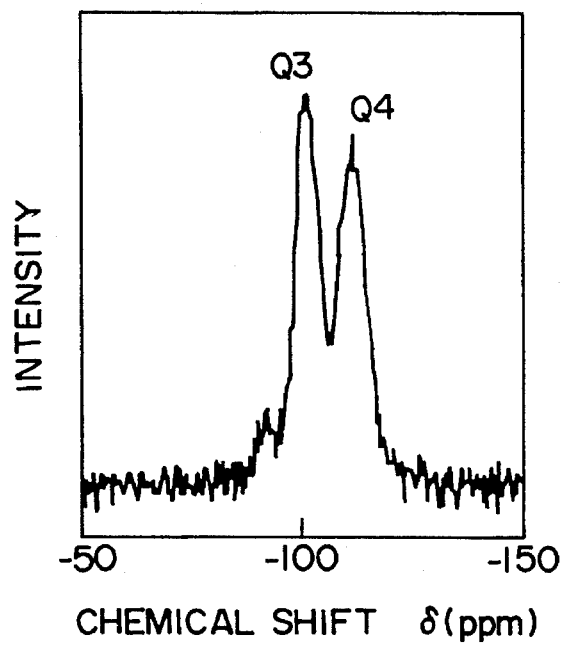
FIG. 14 is a diagram showing $^{29}$Si nuclear magnetic resonance spectrum for the porous material obtained in Example 7.
Figure 15:
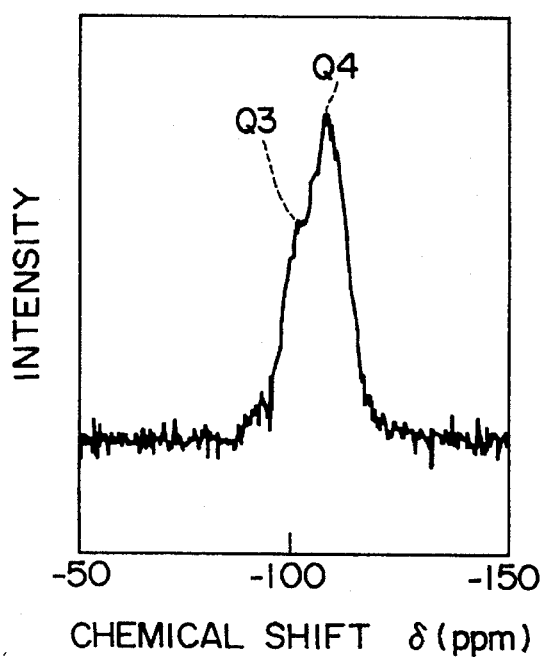
FIG. 15 is another diagram showing $^{29}$Si nuclear magnetic resonance spectrum for the porous material obtained in Example 7.

The powder X-ray diffraction pattern, the nitrogen adsorption isotherm, and the $^{29}Si$-MASNMR (magic angle spinning nuclear magnetic resonance) spectrum of the resulting product were obtained, and the results are given in FIGS. 12, 13, and 14, respectively. The powder X-ray diffractogram identifies four diffraction peaks assigned to a hexagonal crystal structure, showing that a porous material having a regular hexagonal structure results even after the treatment. The nitrogen absorption isotherm shows that a large quantity of nitrogen is adsorbed. It is evidenced therefrom that the treatment removes surfactant from the composite, and that it leaves over fine pores in the material. The specific surface area of the resulting composite as determined by BET (Brunauer-Emmett and Teller's) method is 900 $m^2/g$, a value well comparable to that obtained on a porous material produced by removing the surfactant by calcining process. The rise in adsorption quantity as observed in the vicinity of a relative vapor pressure ($P/P_0$) of 0.35 is more abrupt as compared with that observed for a porous material obtained by calcining process (see FIG. 10). It can be seen therefrom that the porous material produced by the ion-cxchange process yields pores more uniform in size. In other words, the porous material obtained in the present Example consists of pores distributed over a narrower range. With respect to $^{29}Si$ MASNMR spectrum, the peaks assigned as $Q^3$ and $Q^4$ are observed to have approximately the same intensity. For comparison, a $^{29}Si$ MAS-NMR spectrum for a porous material whose surfactant is removed by calcining process is given in FIG. 15. It can be seen therefrom that the porous material prepared by calcining process yields a weak peak assigned as $Q^3$, while the peak assigned as $Q^4$ is observed to be dominant. Accordingly, it can be concluded that the porous material obtained by removing the surfactant through an ion-exchange process contain more surface silanol groups as compared with that prepared by calcining process. Thus, the pores of the porous material obtained by ion-exchange process become more hydrophilic in the inside as to facilitate the adsorption of hydrophilic substances. That is, materials which are apt to undergo interaction with OH groups can be easily adsorbed by the porous material prepared by the ion-exchange treatment. Furthermore, organic or inorganic compounds can be bonded to the porous material via the silanol groups. It is also possible to implement a material having an amplified function or a novel function by thus fixing a functional compound inside the pores.

EXAMPLE 8

Wet Kanemite was prepared in the same manner as that described in Example 5. A 50-g portion (in dry basis) of wet Kanemite was dispersed in an aqueous solution prepared by dissolving 0.1 mol of an alkyltrimethylammonium $[C_nH_{2n+1}N^+(CH_3)_3]$ bromide (where n is 8, 10, or 12) or chloride (where n is 14, 16, or 18) in 1 l of water. In the formula, n represents the number of carbon atoms in the alkyl group constituting alkyltrimethylammonium, where the alkyl chain is longer with increasing value of n. The pH of the thus obtained dispersion was within the range of from 11.5 to 12.5. The resulting dispersion was heated at 70° C. for a duration of 3 hours while stirring. The pH of the dispersion was adjusted to 8.5 thereafter by adding dropwise a 2-N aqueous solution of hydrochloric acid. The dispersion was cooled to room temperature after further heating it at 70° C. for an additional 3 hours. The solid product was separated by filtration, and was dispersed again in 1 l of water to subject the dispersion to stirring for a duration of 5 minutes. After repeating five times the filtration and dispersion of the product in water followed by stirring, the resulting product was dried. Finally, the product was calcined in an electric furnace at 550° C. for a duration of 6 hours to obtain 6 types of porous materials.

Figure 16:
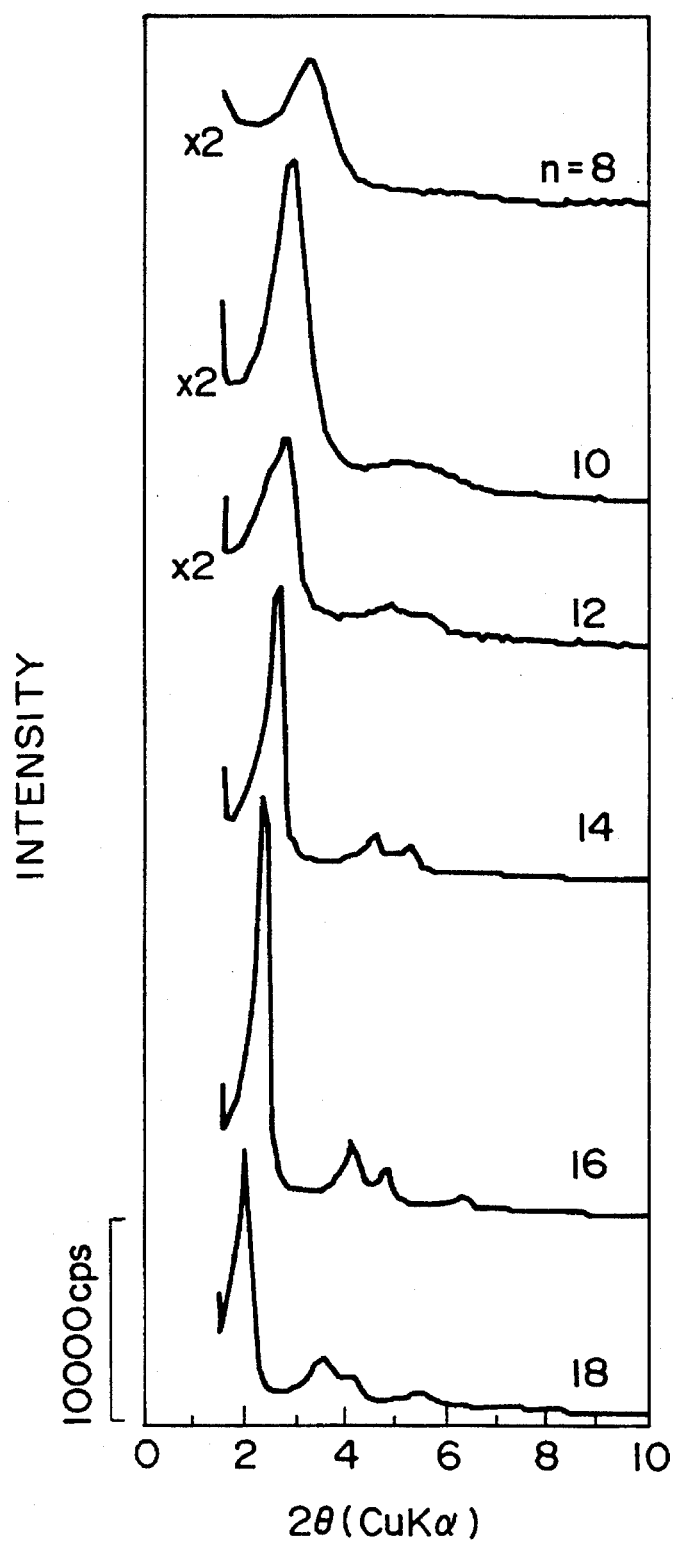
FIG. 16 is a diagram showing the powder X-ray diffraction pattern for the porous material obtained in Example 8.
Figure 17:
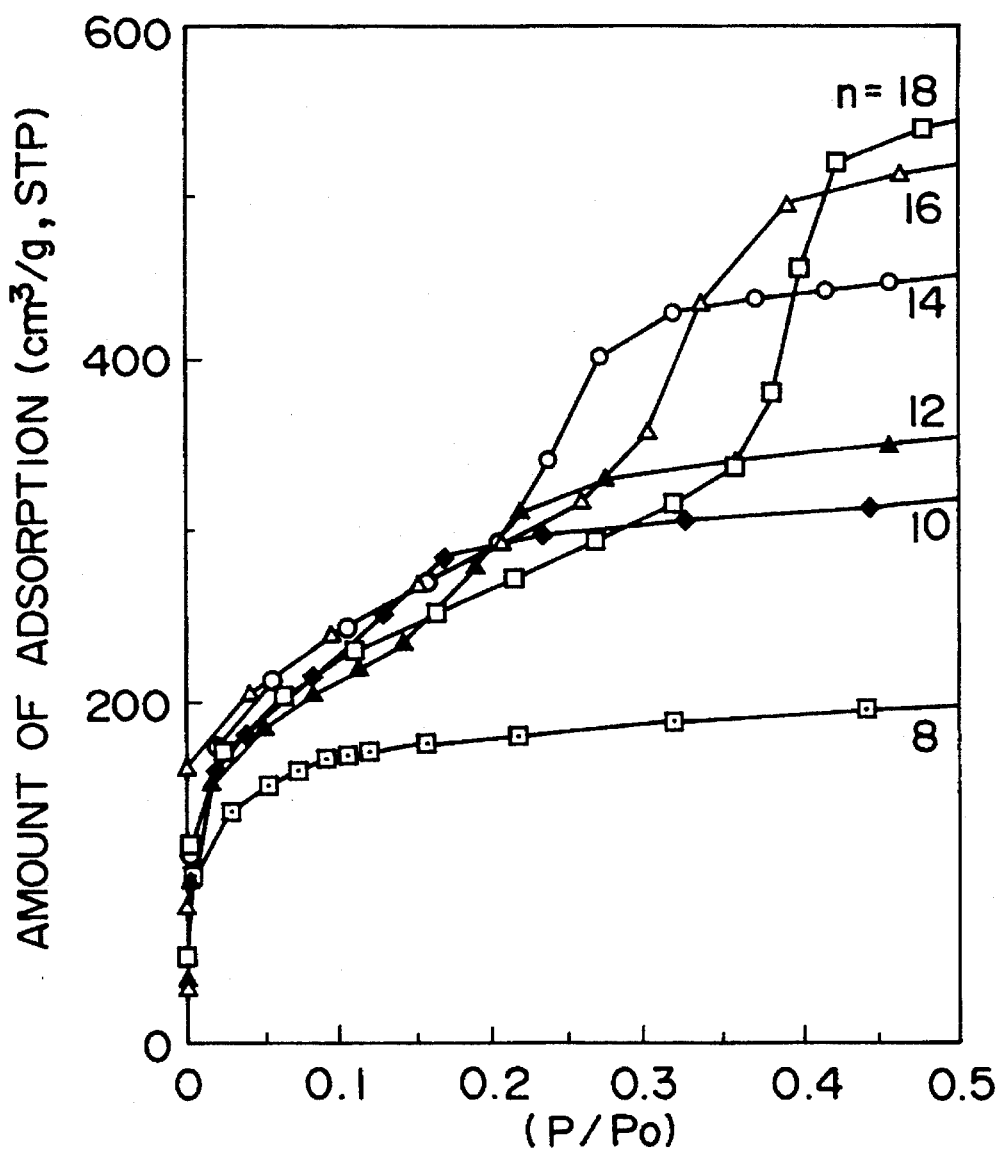
FIG. 17 is a diagram showing the nitrogen adsorption isotherm for the porous material obtained in Example 8.

The powder X-ray diffraction pattern and the nitrogen adsorption isotherm of the resulting product were obtained, and the results are given in FIGS. 16 and 17, respectively. In Table 2 are summarized the lattice parameters calculated from the (100) X-ray diffraction peak, together with the pore diameter, BET specific surface area, and pore volume obtained from the nitrogen adsorption isotherm.

Hexagonal structures were identified on all of the X-ray diffraction patterns obtained for the porous materials. The lattice parameters were observed to expand with increasing alkyl chain length of alkyltrimethylammonium used as the starting material in the synthesis. The same tendency was observed on the pore diameter. It can be concluded therefrom that the pore diameter of the porous material can be controlled by changing the length of the alkyl chain of the starting alkyltrimethylammonium.

TABLE 2

| Alkyl Chain Length* | Lattice Parameter (nm) | Pore Diameter (nm) | BET specific Surface Area (m²/g) | Pore Volume (cm³/g) |
| --- | --- | --- | --- | --- |
| 8 | 3.09 | <1.3 | 680 | 0.2 |
| 10 | 3.28 | 1.6–1.9 | 999 | 0.5 |
| 12 | 3.68 | 1.9–2.2 | 923 | 0.65 |
| 14 | 3.90 | 2.1–2.4 | 1,017 | 0.85 |
| 16 | 4.38 | 2.4–3.0 | 1,031 | 0.95 |
| 18 | 4.90 | 2.9–3.3 | 929 | 1.05 |

*: value of n in $[C_nH_{2n+1}N^+(CH_3)_3]$

COMPARATIVE EXAMPLE

The process for producing a comparative sample is described below.

A 54.1-g portion of water glass #3 was mixed with 187.2 g of water, 2.5 g of 97% sulfuric acid, and 33.5 g of hexadecyltrimethylammonium chloride to prepare a reaction solution. The pH of the resulting reaction solution was found to be 11.4. The reaction solution was charged into a Teflon autoclave vessel, and was heated at 110° C. for a duration of 7 days. The DH of the resulting reaction solution was found to be 11.8, and was confirmed that the pH never dropped to a value of 10 or lower during heating. The solid product was recovered by filtration, and was rinsed using 300-ml portions of ion-exchanged water 5 times. After drying, the thus obtained solid product was calcined at 550° C. for 6 hours in air to obtain a comparative sample.

(Evaluation)

Hydrothermal stability test was effected in a manner described below.

A 0.7-g portion for each of the samples prepared according to the process of the present invention (the sample made from 50 g of a sodium silicate in Example 6) and the comparative sample was taken into a 300-ml volume beaker, and a 150-ml portion of ion-exchanged water was added to each of the samples. The resulting samples were each boiled for 12 hours while stirring on a hot stirrer. The resulting samples were each filtrated and dried.

Figure 18:
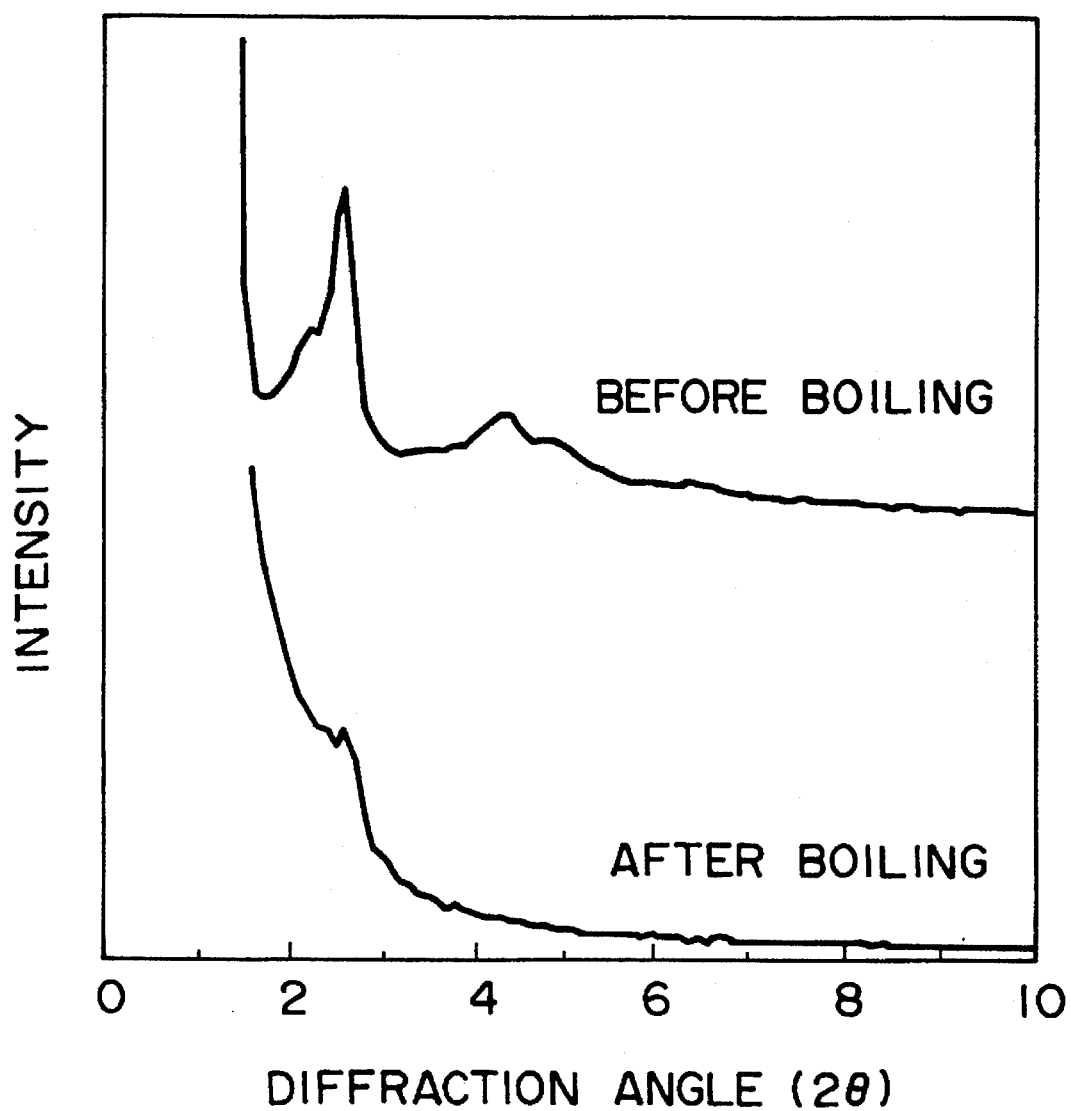
FIG. 18 is a diagram showing the powder X-ray diffraction pattern for the porous material obtained in Comparative Example.

The powder X-ray diffraction patterns were obtained and BET specific surface area were measured for each of the samples before and after boiling. The results are shown in FIGS. 18 and 19, and in Table 3.

TABLE 3

| | BET Specific Surface Area | | Reduction |
| --- | --- | --- | --- |
| Sample | Before Boiling (m²/g) | After Boiling (m²/g) | Ratio (%) |
| Example 6 | 1,350 | 1,340 | 1 |
| Comp. Ex. | 1,480 | 647 | 56 |

The decrease in BET specific surface area of the porous material produced according to the process of the present invention after boiling was found to be as small as 1%. However, the BET specific surface area for the comparative example decreased considerably from the initial value by 56%. Furthermore, no considerable change was observed on the X-ray diffraction patterns for the porous material of the present example even after boiling. In contrast to this, most of the diffraction peaks observed on the initial X-ray diffractogram of the sample were found to diminish after boiling the sample. It can be seen therefrom that the crystal structure of the porous material produced by the process described in the comparative example is destroyed by the boiling treatment, but that the pore structure or the crystal structure remains unchanged even after the porous material produced according to the present invention is subjected to boiling treatment.

While the invention has been described in detail and with reference to specific embodiments thereof, it will be apparent to one skilled in the art that various changes and modifications can be made therein without departing from the spirit and scope thereof.

What is claimed is:

1. A process for producing a porous silicon oxide material, comprising:

a first step of dispersing a substance containing silicon in an aqueous solution of a surfactant, and adjusting the pH of the dispersion to a value of 10 or higher to increase the activity of the surfactant an effective amount to form an aggregate of micelle-like surfactant;

a second step of adjusting the pH of the dispersion to a value lower than 10, and forming a composite of a silicon oxide and the micelle-like surfactant; and a third step of removing the surfactant from the composite while leaving the structure of the silicon oxide substantially intact.

2. A process for producing a porous silicon oxide material as claimed in claim 1, wherein a substance containing an element other than silicon and oxygen is further dispersed in said aqueous solution in the first step.

3. A process for producing a porous silicon oxide material as claimed in claim 1, wherein the substance containing silicon is a composite of silicon with an element other than silicon and oxygen.

4. A process for producing a porous silicon oxide material as claimed in claim 1, wherein the substance containing silicon is a silicate.

5. A process for producing a porous silicon oxide material as claimed in claim 4, wherein the silicate is at least one selected from the group consisting of water glass, a glass, an amorphous sodium silicate, and a silicon alkoxide.

6. A process for producing a porous silicon oxide material as claimed in claim 1, wherein the dispersion in the second step is heated to a temperature of 50° C. or higher.

7. A process for producing a porous silicon oxide material as claimed in claim 1, wherein the substance containing silicon is at least one selected from the group consisting of a silicon oxide and a complex oxide of silicon and a metal other than silicon.

8. A process for producing a porous silicon oxide material as claimed in claim 1, wherein the surfactant is at least one selected from the group consisting of alkyltrimethylammonium, dimethyldialkylammonium, alkylammonium, and benzyltrimethylammonium.

9. A process for producing a porous silicon oxide material as claimed in claim 1, wherein the surfactant is at least one selected from the group consisting of compounds each having a sulfate group, a carboxyl group, or a phosphate group as the terminal group thereof.

10. A process for producing a porous silicon oxide material as claimed in claim 1, wherein the aqueous solution in the first step contains the surfactant at a concentration in the range of from 0.05 to 1M.

11. A process for producing a porous silicon oxide material as claimed in claim 1, wherein the content of the substance containing silicon in the aqueous solution in the first step is in the range of from 10 to 200 g with respect to 1,000 ml of an aqueous solution containing the surfactant at a concentration of 0.1M.

12. A process for producing a porous silicon oxide material as claimed in claim 1, wherein the dispersion in the first step is heated to a temperature in the range of from 40° to 100° C.

13. A process for producing a porous silicon oxide material as claimed in claim 1, wherein the pH of the dispersion in the first step is adjusted to a value in the range of from 11 to 12.5.

14. A process for producing a porous silicon oxide material as claimed in claim 1, wherein the pH of the dispersion in the second step is adjusted to a value in the range of from 6 to 8.5.

15. A process for producing a porous silicon oxide material as claimed in claim 1, wherein the surfactant is removed from the composite in the third step by calcining the composite.

16. A process for producing a porous silicon oxide material as claimed in claim 1, wherein the surfactant is removed from the composite in the third step by an ion-exchange treatment.

17. A process for producing a porous silicon oxide material as claimed in claim 1, further comprising a step of removing a water-soluble component from the dispersion between the first step and the second step.

18. A process for producing a porous silicon oxide material as claimed in claim 17, wherein the water-soluble component is removed by filtration or centrifugation.

19. A process for producing a porous silicon oxide material as claimed in claim 1, wherein the dispersion in the first step is aged until the concentration of the surfactant in the dispersion becomes constant.

20. A process for producing a porous silicon oxide material as claimed in claim 1, wherein the dispersion in the second step is aged until the pH of the dispersion becomes stable.

21. A process for producing a porous silicon oxide material, comprising:

a first step of dispersing a layered silicate in an aqueous solution of a surfactant, and adjusting the pH of the dispersion to a value of 10 or higher to increase the activity of the surfactant an effective amount to form an aggregate of micelle-like surfactant;

a second step of adjusting the pH of the dispersion to a value lower than 10, and forming a composite of a silicon oxide and the micelle-like surfactant; and a third step of removing the surfactant from the composite while leaving the structure of the silicon oxide substantially intact.

22. A process for producing a porous silicon oxide material as claimed in claim 21, wherein the layered silicate is at least one selected from the group consisting of Kanemite, crystalline sodium disilicate, Makatite, Ilerite, Magadite, and Kenyaite.

* * * * *